(12) United States Patent
Gozen

(10) Patent No.: US 7,929,933 B2
(45) Date of Patent: Apr. 19, 2011

(54) NOISE SUPPRESSION APPARATUS, FM RECEIVING APPARATUS AND FM RECEIVING APPARATUS ADJUSTMENT METHOD

(75) Inventor: Shinya Gozen, Hyogo (JP)

(73) Assignee: Panasonic Corporation, Osaka (JP)

( * ) Notice: Subject to any disclaimer, the term of this patent is extended or adjusted under 35 U.S.C. 154(b) by 853 days.

(21) Appl. No.: 11/902,734

(22) Filed: Sep. 25, 2007

(65) Prior Publication Data

US 2008/0287086 A1  Nov. 20, 2008

(30) Foreign Application Priority Data

Oct. 23, 2006 (JP) ................................. 2006-287276

(51) Int. Cl.
*H04B 17/00* (2006.01)
(52) U.S. Cl. ............... 455/226.2; 455/226.1; 455/67.11; 455/63.1
(58) Field of Classification Search .......... 455/296–312, 455/226.1–226.4, 67.11–67.13
See application file for complete search history.

(56) References Cited

U.S. PATENT DOCUMENTS

| | | | | |
|---|---|---|---|---|
| 5,428,832 A | * | 6/1995 | Nohara et al. ................. | 455/296 |
| 5,430,894 A | * | 7/1995 | Nohara et al. ................. | 455/296 |
| 5,740,523 A | | 4/1998 | Nakajima et al. | |
| 5,812,673 A | * | 9/1998 | Nohara et al. .................. | 381/13 |
| 5,982,901 A | * | 11/1999 | Kane et al. ....................... | 381/13 |
| 6,304,545 B1 | * | 10/2001 | Armbruster et al. ........... | 370/210 |
| 7,107,011 B2 | * | 9/2006 | Nakazawa et al. ............ | 455/63.1 |
| 7,245,893 B1 | * | 7/2007 | Husted et al. ................. | 455/226.3 |
| 7,443,431 B2 | * | 10/2008 | Kelly et al. ................. | 455/226.1 |
| 7,647,034 B2 | * | 1/2010 | Maekawa et al. ............. | 455/296 |
| 7,760,258 B2 | * | 7/2010 | Huang et al. ................... | 348/241 |
| 7,830,423 B2 | * | 11/2010 | Suzuki ........................ | 455/67.11 |
| 2002/0128830 A1 | | 9/2002 | Kanazawa et al. | |
| 2008/0064357 A1 | | 3/2008 | Gozen | |

FOREIGN PATENT DOCUMENTS

| | | |
|---|---|---|
| JP | 06-350466 | 12/1994 |
| JP | 08-307465 | 11/1996 |
| JP | 2760240 | 3/1998 |
| JP | 2002-221988 | 8/2002 |
| JP | 2004-314339 | 12/2004 |
| JP | 2005-257749 | 9/2005 |
| WO | 95/01674 | 1/1995 |
| WO | 2006/049052 | 5/2006 |

* cited by examiner

*Primary Examiner* — Lana N Le
(74) *Attorney, Agent, or Firm* — Wenderoth, Lind & Ponack, L.L.P.

(57) ABSTRACT

Variations in characteristics due to individual differences among RFs cause differences between estimated noise spectrum patterns and actually occurring noise characteristics, resulting in variations in noise suppression capabilities. A pattern table stores, in advance, a spectrum pattern of a noise component contained in an audio signal and which is determined for each electric field strength. A noise estimation unit reads out a noise spectrum pattern corresponding to an electric field strength and estimates a noise component contained in an audio signal. A level calculation unit uses a test signal corresponding to a predetermined electric field strength as input to calculate a noise level contained in an audio signal obtained by an FM demodulation unit. A correction value calculation unit uses the calculated noise level to correct the association between the noise spectrum pattern and the electric field strength. The noise estimation unit reads out a noise spectrum pattern according to the association corrected by the correction value calculation unit.

16 Claims, 16 Drawing Sheets

NOISE SUPPRESSION APPARATUS, FM RECEIVING APPARATUS AND FM RECEIVING APPARATUS ADJUSTMENT METHOD

BACKGROUND OF THE INVENTION (1) Field of the Invention

The present invention relates to a noise suppression apparatus that suppresses noise components in a signal that is a received signal of radio wave communication and the like which is contaminated with noise, and in particular, to noise canceling technology for FM receiving apparatuses.

(2) Description of the Related Art

The spectrum subtraction method and the Wiener filter method are two of the most frequently quoted methods in conventional noise suppression technology. These methods are based on the principle of: using a time-series signal contaminated with noise as input; estimating a noise spectrum by assuming that a time segment without sound is a noise segment; and subtracting only the noise component from the inputted signal. With either method, a noise spectrum estimated in order to adjust the amount of noise suppression is generally multiplied by a coefficient $\alpha$ that is a multiplication constant.

$$|Y(f)|=|X(f)|-\alpha|N(f)|$$

In the equation above, X(f) represents an input signal spectrum, N(f) an estimated noise spectrum, Y(f) a signal spectrum after noise suppression, and |X(f)| an amplitude spectrum or a power spectrum of the input signal spectrum X(f). Similarly, |N(f)| and |Y(f)| respectively represent an amplitude spectrum or a power spectrum of N(f) and Y(f).

FIG. 1 is a block diagram showing a configuration example of a noise suppression apparatus using the spectrum subtraction method. To give a simple explanation, the noise suppression apparatus uses as input a time series signal (x(t)=y(t)+n(t)) contaminated with a noise n(t), converts the input signal x(t) at a frequency conversion unit 1001 into a spectrum signal X(f) while simultaneously inputting the input signal x(t) into a sound/noise judging unit 1002, and extracts a noise portion from the input signal x(t) at the sound/noise judging unit 1002. A noise estimation unit 1003 learns the spectrum signal of the noise portion extracted at the sound/noise judging unit 1002 to generate an estimated noise spectrum N(f), whereby the estimated noise spectrum N(f) is subtracted from the input signal spectrum X(f) at a noise suppression unit 1004. After subtraction, the time series signal y(t) is restored from the spectrum signal Y(f) at an inverse frequency conversion unit 1005.

Furthermore, a method is proposed for suppressing generation of abnormal processing noise or reduction in recognition rate due to estimation errors in the estimated noise spectrum, by performing clipping that prevents the value of the signal spectrum after noise suppression from dropping below a predetermined value or by performing smoothing using moving averages and the like on the signal spectrum after noise suppression in order to reduce distortion of the voice spectrum (refer to Japanese Unexamined Patent Application Publication No. 2002-221988).

FIG. 2 is a block diagram showing a configuration example of a noise suppression apparatus that performs clipping during noise suppression using the spectrum subtraction method. When performing subtraction at the noise suppression unit 1004', clipping is performed such that the noise spectrum subtraction result does not drop to or fall below a predetermined value, and a smoothed spectrum signal Z(f) is obtained by a moving average process and the like at a spectrum correction unit 1006. In the following equation, $\alpha$ represents a coefficient while Th represents a threshold.

$$|Y'(f)|=\max(|X(f)|-\alpha|N(f)|,Th)$$

On the other hand, when contemplating a case where a target signal on which noise suppression is to be performed is a received signal of FM radio broadcast, noise characteristics change in accordance with constantly changing electric field strengths. Furthermore, to begin with, it is extremely difficult to extract a noise portion from a signal that contains hardly any soundless portions such as FM radio broadcast and estimate a noise spectrum. Meanwhile, when focusing on heat noise generated at a receiver or, more particularly, at an RF element as a noise generating factor, since elements that become noise generating factors differ according to the strength of the receiving electric field, it is possible to calculate and pattern in advance a noise spectrum for each electric field strength. FIG. 3 is a block diagram showing a configuration of a noise suppression apparatus that stores a noise spectrum pattern for each electric field strength and suppresses noise using the spectrum subtraction method. In this example, significant noise suppression effects are produced by patterning a noise spectrum per electric field strength (refer to Japanese Patent No. 2760240). In this example, estimation of a noise spectrum is performed by using as input an electric field signal S(t) representing an electric field strength together with an input signal instead of providing the sound/noise judging unit 1002 shown in FIG. 1, and reading out pattern data stored in a pattern table 1007 based on the electric field signal S(t) at the noise estimation unit 1003.

However, as shown in Japanese Patent No. 2760240, when storing a noise spectrum calculated in advance as pattern data and using the noise spectrum in an estimated noise spectrum, since actually occurring noise characteristics vary according to individual differences among RFs, there is a problem in that variations in noise suppression capabilities occur among sets such that, for example, a desired noise suppression effect is not obtained due to differences occurring between a noise spectrum pattern read out from the pattern table 1007 and an actually occurring noise spectrum. FIG. 4A is a diagram showing variations in input/output characteristics per RF. FIG. 4B is a diagram showing variations in noise spectrums in the same electric field. FIG. 5 is a diagram showing a deviation between a noise spectrum pattern stored in the pattern table 1007 and noise spectrums actually occurring per RF samples using as an example a case where the electric field strength is 10 [dBuV]. In FIG. 5, while the noise spectrum of sample B (dashed line) approximately matches the noise spectrum pattern (bold line) in the pattern table 1007, the noise spectrum of sample A (solid line) deviates significantly from the noise spectrum pattern. When performing noise suppression in this state, since subtraction is performed using a noise spectrum pattern that is at a lower level than the actual noise spectrum, the insufficient suppression amount leads to a decrease in suppressive capabilities. Conversely, when the noise spectrum pattern is at a higher level than the actual noise spectrum, excessive subtraction becomes a factor for generating of abnormal processing noise.

Dissolution of individual differences between RFs requires the use of high-quality components with little variation through the improvement of current RFs, and may result in significant increases in cost. In addition, there is a problem in that even when re-calculating noise spectrum in the adjustment stage and restructuring pattern data without enhancing the capabilities of RFs, a significantly large number of man-hours are required.

SUMMARY OF THE INVENTION

In order to solve the aforementioned problem, the noise suppression apparatus according to the present invention is a noise suppression apparatus which suppresses a noise component contained in an audio signal obtained by receiving a broadcast signal transferred via a transfer path including ground waves and satellite waves, the noise suppression apparatus includes: a pattern data storage unit which stores, in advance, plural spectrum patterns of the noise component that are determined for each electric field strength; a noise estimation unit which acquires data indicating the electric field strength of the received broadcast signal, reads out a noise spectrum pattern corresponding to the electric field strength indicated by the acquired data from the pattern data storage unit, and estimates a noise component contained in the audio signal; a noise suppression unit which suppresses the estimated noise component contained in the audio signal; a level calculation unit which calculates a noise level contained in an audio signal obtained by inputting a test signal instead of the broadcast signal, the test signal corresponding to a predetermined electric field strength; and a correction unit which corrects an association between the noise spectrum pattern stored in the pattern data storage unit and the electric field strength using the noise level calculated by the level calculation unit, wherein the noise estimation unit reads out the noise spectrum pattern according to the association corrected by the correction unit.

Moreover, the present invention may be realized not only as a noise suppression apparatus such as described above, but may also be configured as an FM receiving apparatus provided with this noise suppression apparatus. The present invention may also be realized as: a noise suppression method including as steps the characteristic unit of the noise suppression apparatus; a program stored on a non-transitory computer-readable medium that causes a computer to execute such steps; or a semiconductor IC (Integrated Circuit) such as an LSI (Large Scale Integration).

According to the present invention, a simple adjustment using a test signal corresponding to a predetermined electric field strength enables optimization adjustment to be performed in all electric field strengths targeted by the present noise suppression apparatus. Therefore, translation into practical use may be achieved without affecting the adjusting stage at the factory. According to the present invention, since deviations in associations between all noise spectrum patterns stored in advance and electric field strengths may be corrected by basically using only one test signal and from a set formed by a single corresponding electric field strength and a single calculated noise level, an effect may be achieved in that the number of man-hours required for the optimization of the noise spectrum pattern may be kept to a minimum.

FURTHER INFORMATION ABOUT TECHNICAL BACKGROUND TO THIS APPLICATION

The disclosure of Japanese Patent Application No. 2006-287276 filed on Oct. 23, 2006 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENT(S)

Embodiments of the present invention will be described below with reference to the drawings.

First Embodiment

Figure 6:
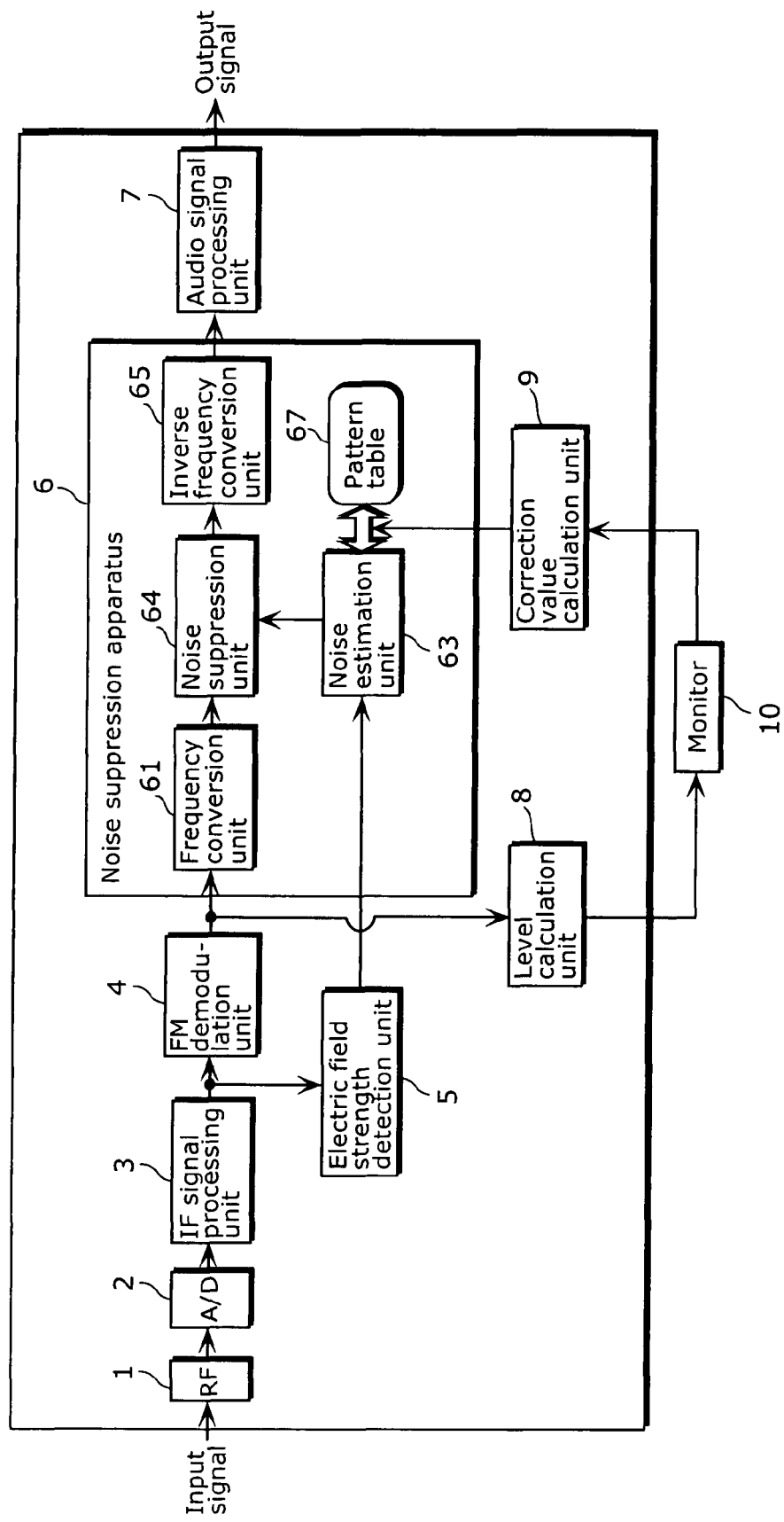
FIG. 6 is a block diagram showing a configuration of an FM receiving apparatus using the noise suppression apparatus according to the present invention.

FIG. 6 is a block diagram showing a configuration of an FM receiving apparatus using the noise suppression apparatus according to the present invention. The FM receiving apparatus shown in FIG. 6 is an FM receiving apparatus including a noise suppression apparatus that calculates a correction value from the difference between a noise level contained in an audio signal actually obtained using as an input a test signal corresponding to a predetermined electric field strength and a noise level that should be calculated when the test signal is used as an input, and corrects the association between a noise spectrum pattern and an electric field strength, the FM receiving apparatus including: an RF 1; an A/D (Analogue/Digital) converter 2; an IF (Intermediate Frequency) signal processing unit 3; an FM demodulation unit 4; an electric field strength detection unit 5; a noise suppression apparatus 6; an audio signal processing unit 7; a level calculation unit 8; a correction value calculation unit 9; and a monitor 10. Furthermore, the noise suppression apparatus 6 includes: a frequency conversion unit 61; a noise estimation unit 63; a noise suppression unit 64; an inverse frequency conversion unit 65; and a pattern table 67. The RF 1 uses a radio signal received by an antenna, not shown, as input, and converts the radio signal (RF signal) into an intermediate frequency signal (IF signal). The A/D converter 2 converts the analog IF signal obtained by the RF 1 into a digital IF signal. Thereafter, the IF signal processing unit 3 converts the digitized IF signal into a complex base band signal (complex BB signal). The FM demodulation unit 4 converts the complex BB signal into an audio signal. More specifically, the FM demodulation unit 4 has a function for demodulating and converting an FM-modulated signal into an FM composite signal and a function for removing a stereo pilot signal from the FM composite signal to convert the FM composite signal into an audio signal. In this case, the antenna, the RF 1, the A/D converter 2, the IF signal processing unit 3 and the FM demodulation unit 4 are examples of an FM demodulation unit which receives an FM-modulated broadcast signal and performs FM demodulation. Subsequently, the noise suppression apparatus 6 suppresses the noise component contained in the audio signal, and the audio signal processing unit 7 then outputs a sound/audio signal. The audio signal processing unit 7 has functions such as stereo separation control, high frequency cutoff control, and volume control which are commonly used in general FM receiving apparatuses. In the FM receiving apparatus according to the present first embodiment, since the noise suppression apparatus 6 is applied prior to stereo separation, an L+R/L−R signal is to be used as input instead of an L/R signal. Generally, in FM stereo signals, more noise exists in the L−R signal than in the L+R signal. Accordingly, in the FM receiving apparatus according to the present first embodiment, since noise suppression is performed on the L+R/L−R signal instead of the L/R signal at which noise is dispersed by stereo separation, noise components may be suppressed more efficiently. Needless to say, the present embodiment may be alternately configured such that a portion of or all of the functions of the audio signal processing unit 7 is processed at the front stage of the noise suppression apparatus 6.

Figure 7:
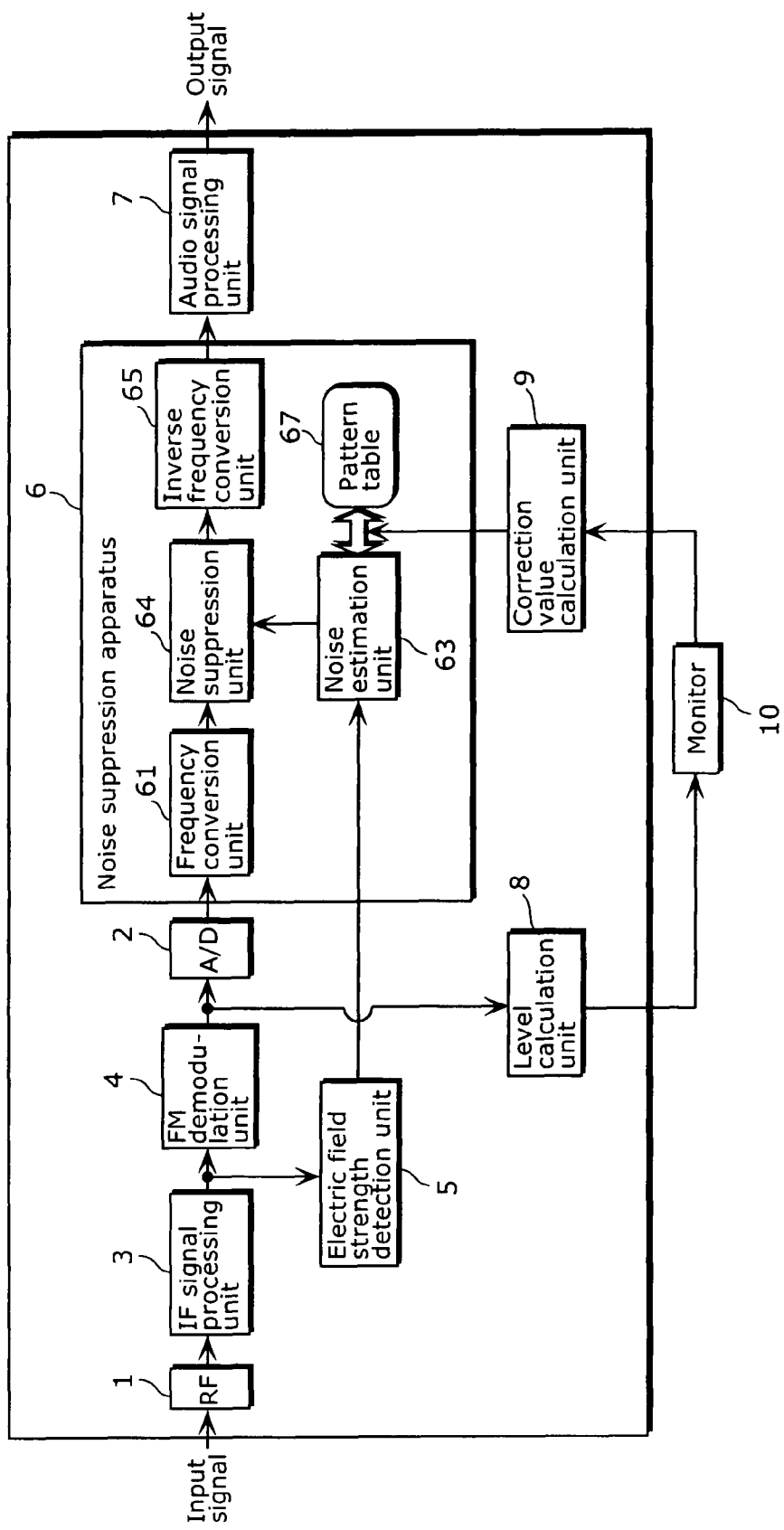
FIG. 7 is a block diagram showing another configuration example of an FM receiving apparatus using the noise suppression apparatus according to the present invention.

Moreover, although the A/D converter 2 is used because the description of the FM receiving apparatus shown in FIG. 6 is based on the premise of a configuration of a DIF tuner using a demodulation method by digital signal processing that is becoming the mainstream of vehicle-mounted radio tuners in recent years, the noise suppression apparatus according to the present invention is not limited to any particular digital/analog configuration. In the case of an analog configuration, the A/D converter 2 is no longer required. In addition, FIG. 7 is a block diagram showing another configuration example of an FM receiving apparatus using the noise suppression apparatus according to the present invention. As shown in FIG. 7, A/D conversion may be performed at the front stage of the noise suppression apparatus 6, and only noise suppression may be performed by digital signal processing. Needless to say, the audio signal inputted to the level calculation unit 8 may be a signal digitized by the A/D converter 2.

Next, processing performed by the noise suppression apparatus 6 will be described. At the same time the frequency conversion unit 61 uses an FM-demodulated audio signal as an input for conversion into an input signal spectrum, the noise estimation unit 63 uses an electric field signal detected by the electric field strength detection unit 5 as input to calculate an estimated noise spectrum. For noise estimation, calculation is performed by reading out a spectrum pattern corresponding to the inputted electric field strength from the pattern table 67 which stores noise spectrum patterns that are patterned from per-electric field strength noise characteristics measured in advance. In this case, the pattern table 67 is an example of a pattern data storage unit that stores in advance spectrum patterns of the noise components which are determined for each receiving electric field strength. In addition, the noise estimation unit 63 is an example of a noise estimation unit that acquires data indicating the electric field strength of the received broadcast signal, reads the noise spectrum pattern corresponding to the electric field strength indicated by the acquired data from the pattern data storage unit, and estimates a noise component contained in the audio signal. The noise suppression unit 64 is an example of a noise suppression unit that suppresses the estimated noise component contained in the audio signal. The noise suppression unit 64 removes the noise component contained in the inputted signal spectrum by subtraction. The inverse frequency conversion unit 65 restores the time series audio signal. Conventionally well-known FFT (Fast Fourier Transform)/IFFT (Inverse Fast Fourier Transform) are generally used for frequency conversion/inverse frequency conversion. However, since these methods are well known, detailed descriptions of the methods are omitted.

At this point, with an ordinary FM receiving apparatus, in order to adjust each set prior to shipment, various parameters are normally optimized by inputting a known test signal instead of a radio signal. For instance, in order to optimize the electric field strength detection unit 5, circuit elements and register preset values are adjusted so that a desired electric field signal is calculated by the electric field strength detection unit 5 when a test signal corresponding to a predetermined electric field strength is inputted to the FM receiving apparatus.

With the present noise suppression apparatus 6, adjustment is necessary to match noise spectrum patterns stored in the pattern table 67 to the noise characteristics of RF1 for each FM receiving apparatus set.

Figure 8B:
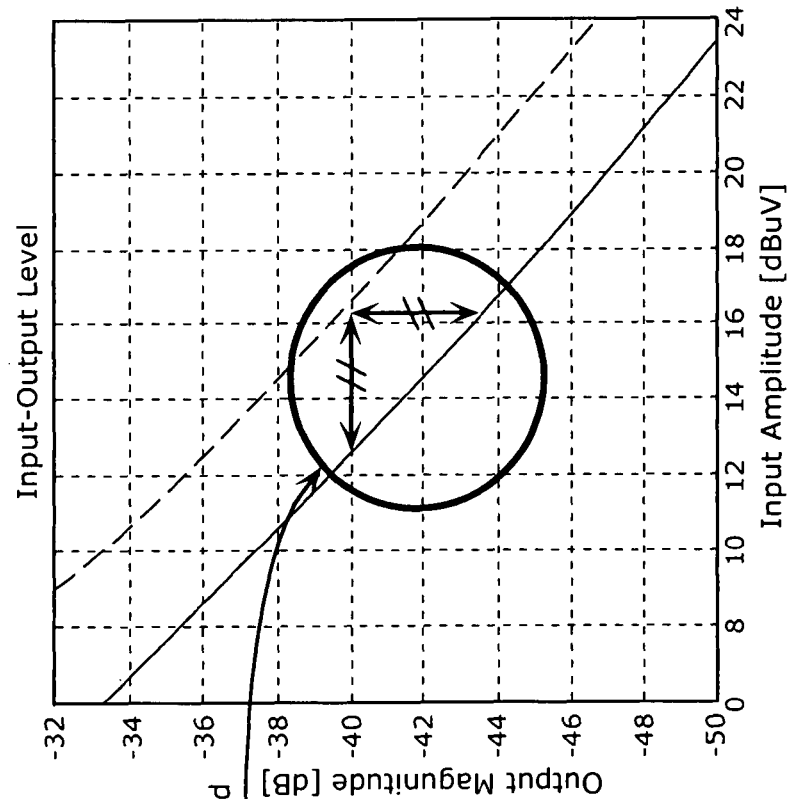
FIG. 8B is an enlarged view of a portion of the two input/output characteristics shown in FIG. 8A.
Figure 8A:
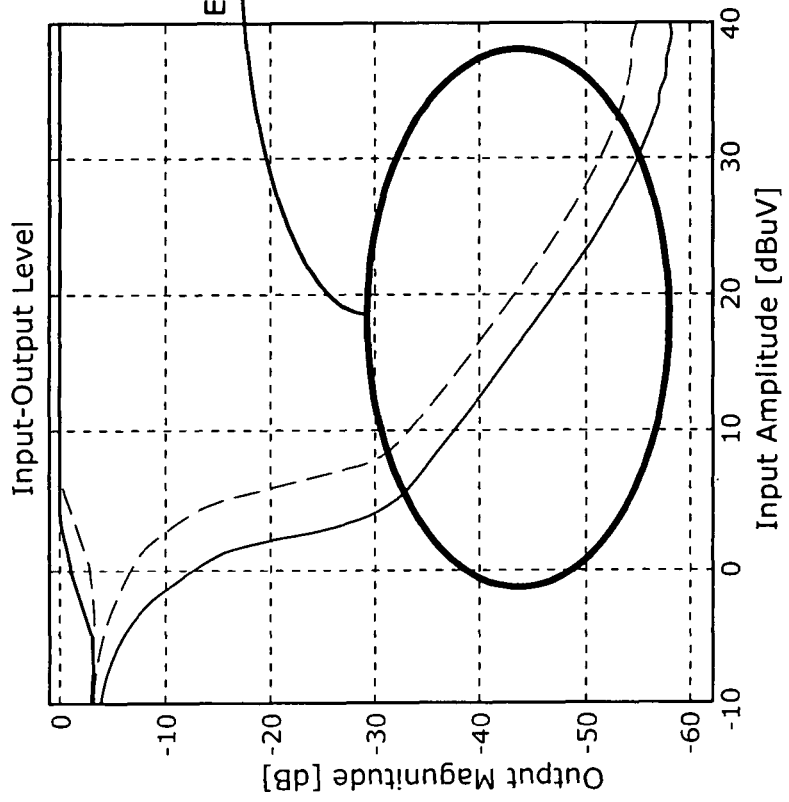
FIG. 8A is a graph showing input/output characteristics representing an example of relationships between input electric field strengths, signal levels of output signals, and noise levels of two samples (FM receiving apparatuses)

At this point, a detailed analysis of the relationship between input electric field strength and output signal level in an FM receiving apparatus reveals that an electric field area exists in which the output level changes in proportion to the input electric field. FIG. 8A is a graph showing input/output characteristics representing an example of relationships between input electric field strengths, signal levels of output signals, and noise levels of two samples (FM receiving apparatuses). FIG. 8B is an enlarged view of a portion of the two input/output characteristics shown in FIG. 8A. As shown in FIG. 8B, enlarging the electric field area (an electric field strength range) in which the input electric field strength and output noise level are in a proportional relationship reveals that the amount of change of the input electric field strength matches the amount of change of the output noise level. In other words, this shows that an error in the output noise level with respect to an input electric field strength is adjustable using the difference between a reference noise level at a given single input electric field strength and a noise level value calculated with respect to the same electric field strength at the FM receiving apparatus to be adjusted.

More specifically, for noise spectrum pattern adjustment, a non-modulated signal (a signal obtained by FM-modulating a soundless signal) corresponding to a predetermined electric field strength is inputted to the RF 1 as a test signal, and an audio signal outputted by the FM demodulation unit 4 is inputted to the level calculation unit 8 to calculate a noise level. In this case, since the inputted test signal is a non-modulated signal, the audio signal outputted by the FM demodulation unit 4 is a soundless signal. Thus, the signal level of the audio signal is none other than the noise level.

The level calculation unit 8 is an example of a level calculation unit for calculating a noise level contained in an audio signal obtained when a test signal corresponding to a predetermined electric field strength is inputted, and is also an example of a level calculation unit for calculating a noise level contained in a signal obtained with respect to the inputted test signal that is generated through a simulation of a broadcast signal on which a soundless signal is transferred and which is received at a predetermined electric field strength. In the present embodiment, the level calculation unit 8 outputs the calculated noise level to the monitor 10 externally connected to the FM receiving apparatus. The monitor 10 is a monitor connected to the FM receiving apparatus only during adjustment prior to shipment, and displays the noise level outputted by the level calculation unit 8. An operator externally monitoring the adjustment of the FM receiving apparatus re-inputs the noise level displayed on the monitor 10 to the correction value calculation unit 9.

Figure 1:
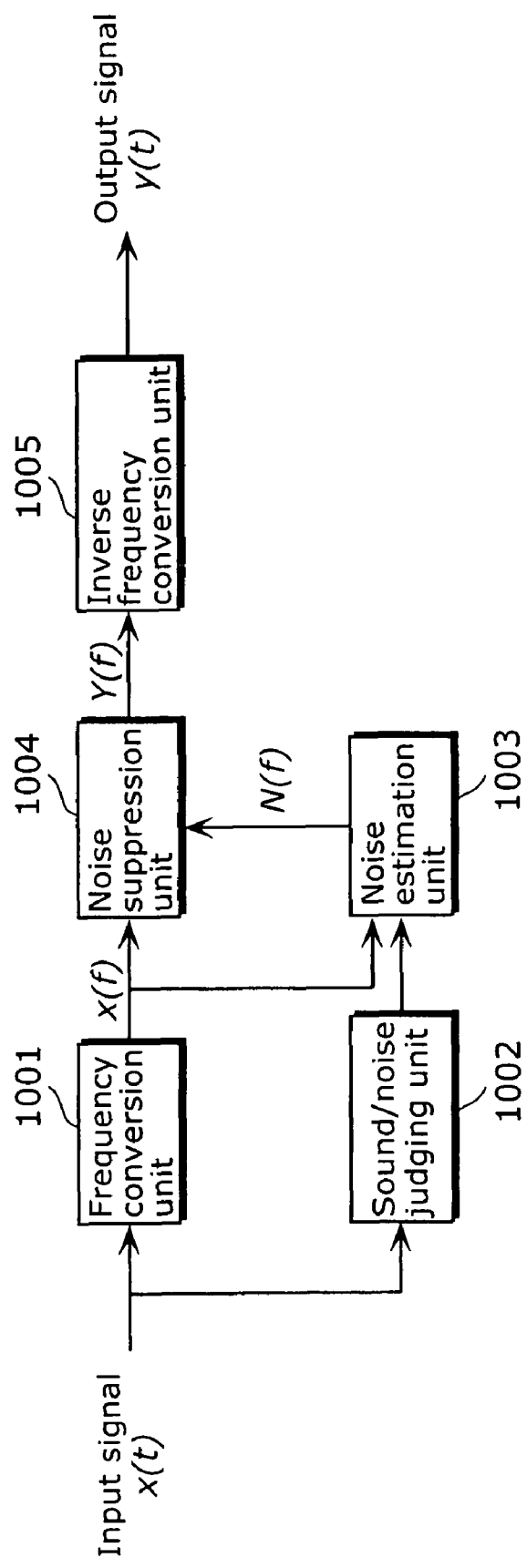
FIG. 1 is a block diagram showing a configuration example of a conventional noise suppression apparatus using the spectrum subtraction method.
Figure 2:
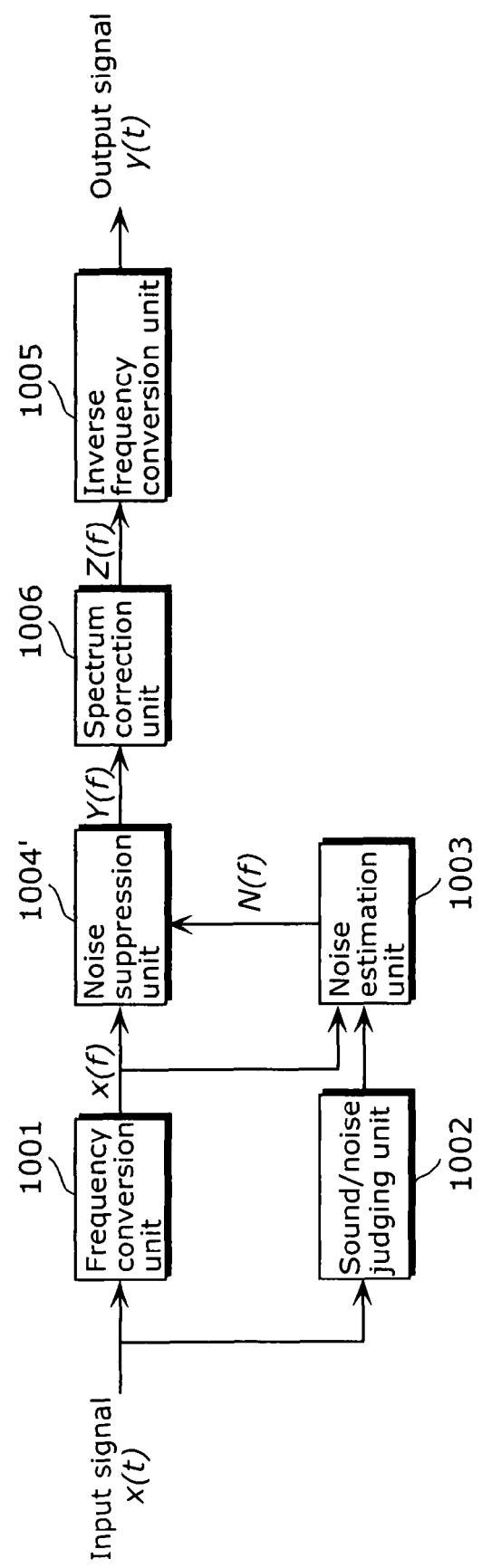
FIG. 2 is a block diagram showing a configuration example of a noise suppression apparatus that performs clipping during noise suppression using the spectrum subtraction method.
Figure 3:
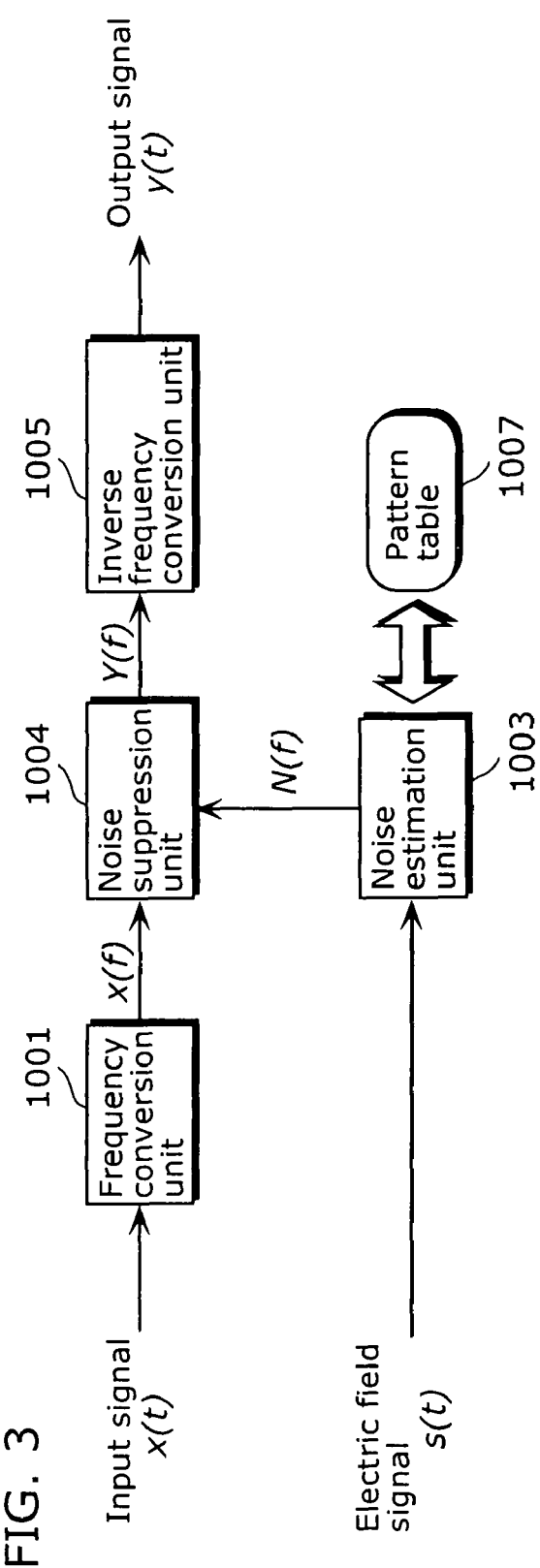
FIG. 3 is a block diagram showing a configuration of a noise suppression apparatus that stores a noise spectrum pattern for each electric field strength and suppresses noise using the spectrum subtraction method.
Figure 4B:
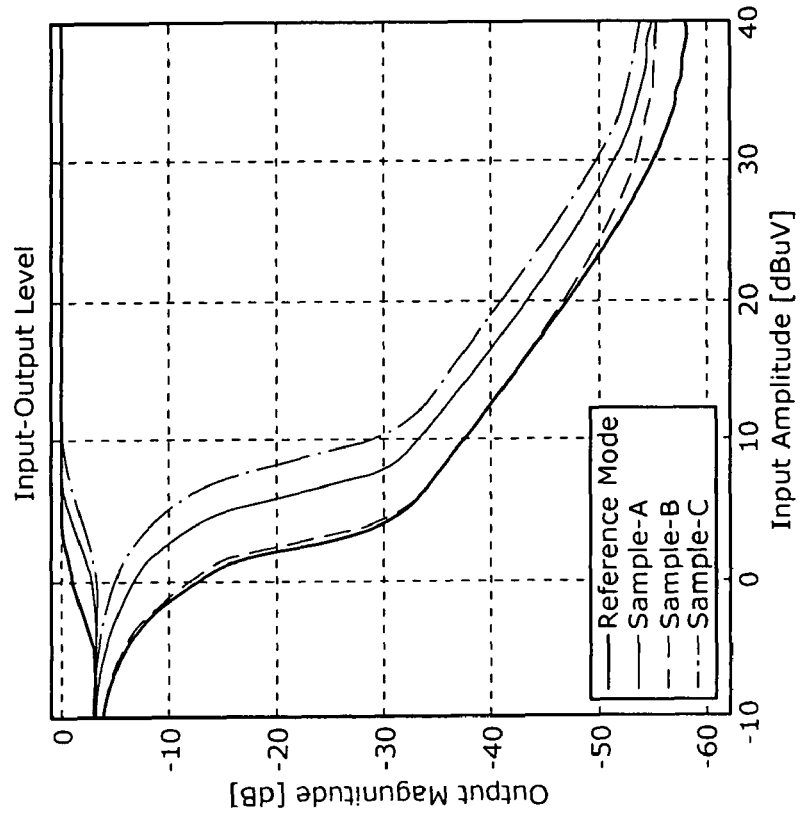
FIG. 4B is a diagram showing variations in noise spectrums in the same electric field.
Figure 4A:
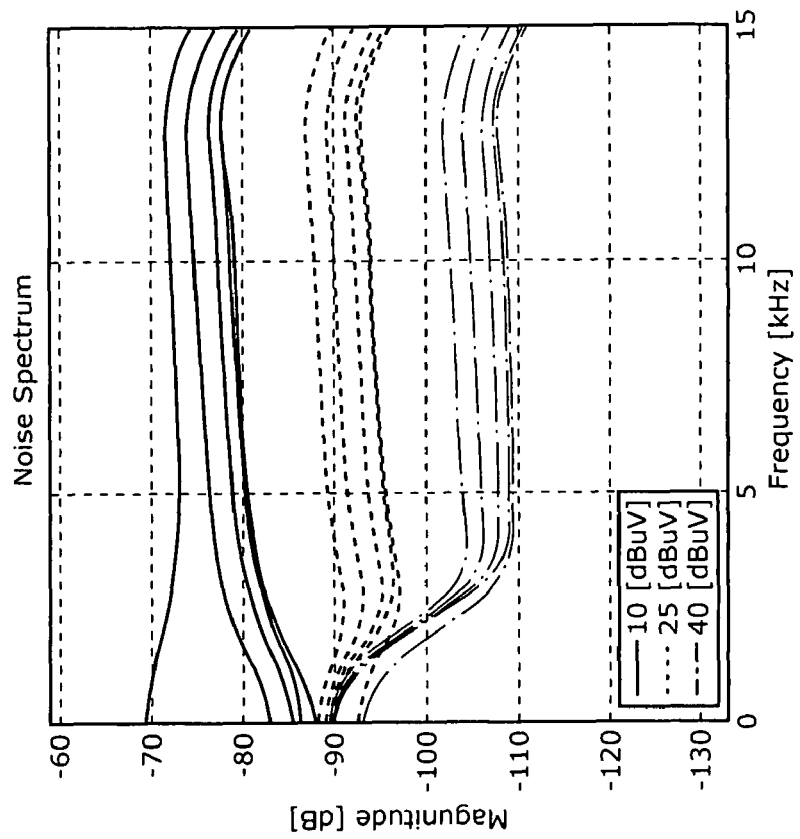
FIG. 4A is a diagram showing variations in input/output characteristics per RF.
Figure 5:
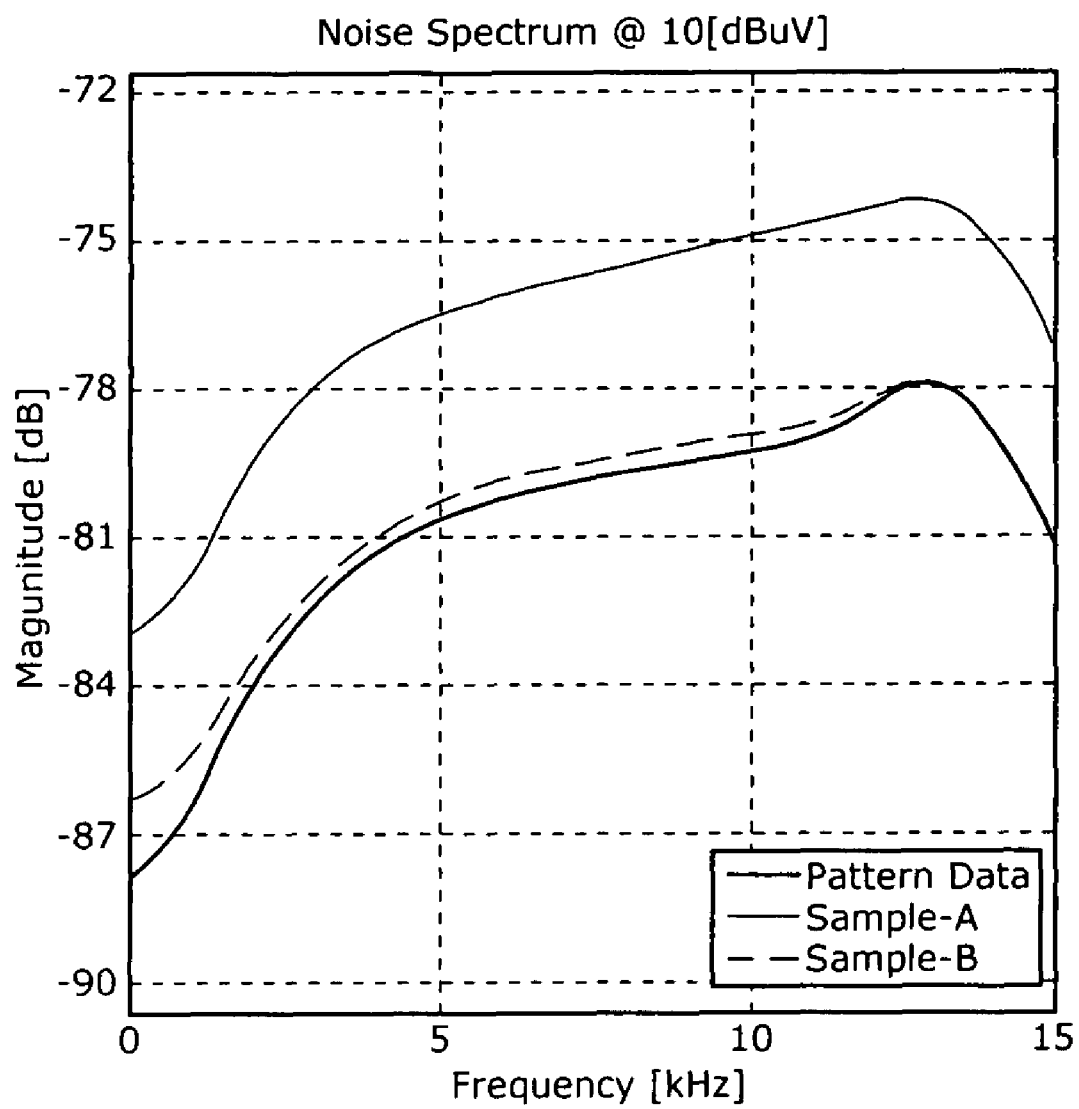
FIG. 5 is a diagram showing a deviation between a noise spectrum pattern stored in the pattern table 1007 and a noise spectrum actually occurring at each RF sample using as an example a case where the electric field strength is 10 [dBuV]
Figure 9:
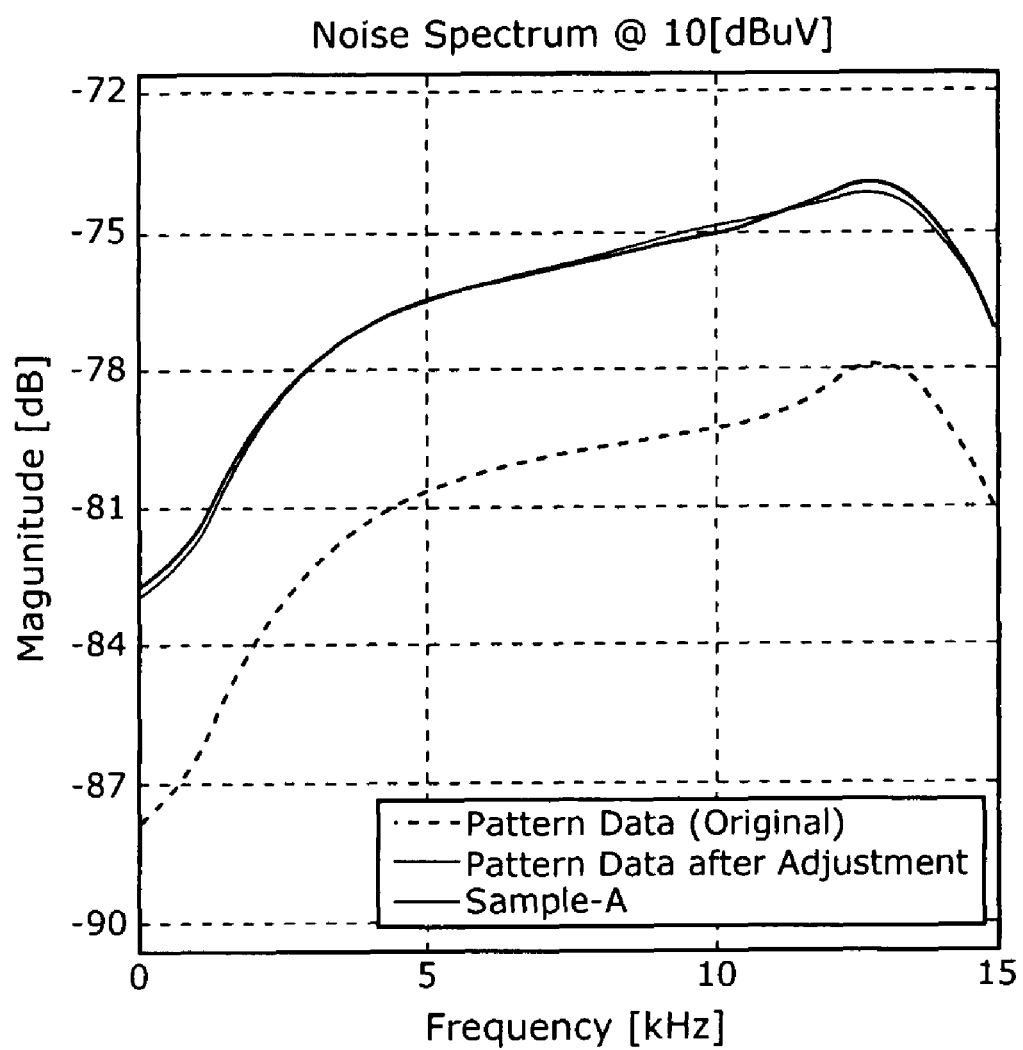
FIG. 9 is a diagram showing results of correction performed on a noise spectrum pattern with respect to sample A described in FIG. 4A using as an example a case where the electric field strength is 10 [dBuV]

The correction value calculation unit 9 is an example of a correction unit that corrects the association of the noise spectrum pattern stored in the pattern data storage unit with the electric field strength using a noise level calculated by the level calculation unit, and in the present embodiment, calculates a correction value of the electric field strength associated with the noise spectrum pattern stored in the pattern table 67 and uses the correction value as an optimization parameter when performing noise estimation. As a concrete example of a correction method, a difference value between an actually calculated noise level and a reference noise level that should be calculated is used as a correction value of an electric field strength associated with a noise spectrum pattern. The correction value calculation unit 9 corresponds to a correction unit that compares the noise level actually calculated by the level calculation unit with the noise level that should be calculated with respect to the test signal and uses the comparison result to correct the electric field strength associated with the noise spectrum pattern. In addition, the correction value calculation unit 9 corresponds to a correction unit that calculates the difference between the noise level actually calculated by the level calculation unit and the noise level that should be calculated with respect to the test signal, and uses the calculated difference value itself as a correction amount to correct the electric field strength associated with the noise spectrum pattern. More specifically, the correction value calculation unit 9 calculates the difference between a noise level inputted by the operator and a reference noise level calculated in advance with respect to the test signal. The correction value calculation unit 9 uses the calculated difference value as a correction value (offset) of the electric field strength inputted when the noise estimation unit 63 reads out a noise spectrum pattern from the pattern table 67. To give a description using the input/output characteristics shown in FIG. 8B, the difference (the difference in the direction of the ordinate axis) of an output noise level calculated at a single input electric field strength corresponds as-is to the difference of an input electric field strength (the difference in the direction of the abscissa axis) that outputs the calculated output noise level. At this point, the correction value calculation unit 9 stores the noise level (reference noise level) at the time of creation of the pattern data, and calculates a difference value as a correction value between the noise level calculated when inputting a test signal corresponding to the same electric field strength and the stored reference noise level. Noise estimation is performed by using a correction value that is the noise level difference as the correction value (offset) of an electric field strength associated with the noise spectrum pattern. FIG. 9 is a diagram showing results of correction performed on a noise spectrum pattern with respect to sample A described in FIG. 4A using as an example a case where the electric field strength is 10 [dBuV]. Before correction, the noise spectrum at a received electric field strength of 10 [dBuV] was estimated by reading out the noise spectrum pattern at 10 [dBuV], and a deviation had occurred with respect to the actual noise spectrum. In contrast, the noise suppression apparatus 6 according to the present first embodiment corrects the readout of a noise spectrum pattern as described below. For instance, when the predetermined electric field strength on which adjustment is to be performed is determined as 20 [dBuV], from FIG. 4A, the reference noise level is stored as −37 [dB] and the noise level when a test signal is inputted to sample A is calculated as −32 [dB]. Therefore, it is revealed that the noise level of sample A is 5 [dB] higher than the reference noise level. Accordingly, the correction value calculation unit 9 sets the correction value with respect to sample A to +5 [dBuV], and in the example shown in FIG. 9 described above, the noise spectrum at a received electric field strength of 10 [dBuV] is estimated by reading out and correcting the noise spectrum pattern at 15 [dBuV].

Figure 10:
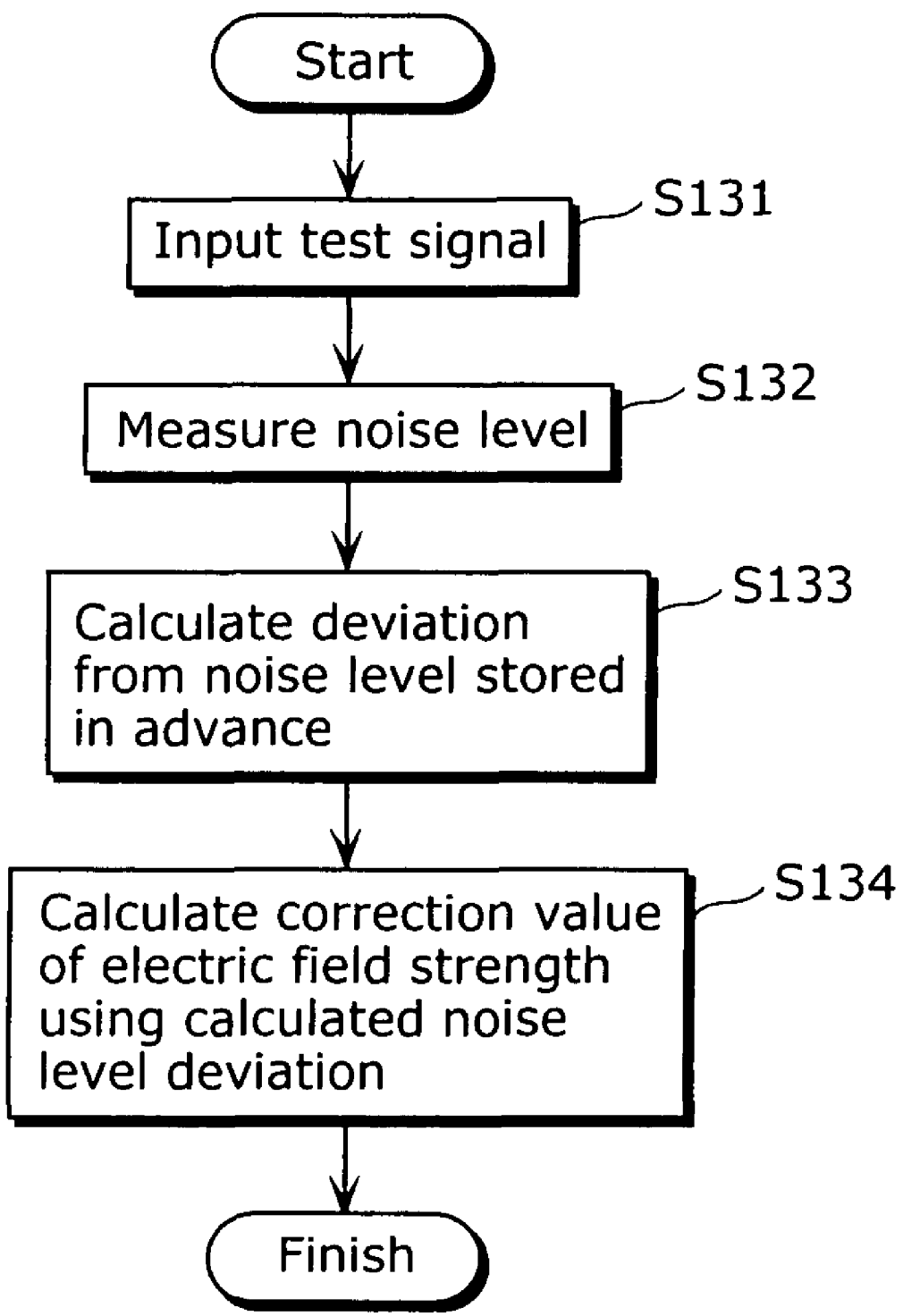
FIG. 10 is a flowchart showing an example of a processing procedure of an adjustment method using noise levels at the FM receiving apparatus shown in FIG. 6.

FIG. 10 is a flowchart showing an example of a processing procedure of an adjustment method using noise levels at the FM receiving apparatus shown in FIG. 6. As shown in FIG. 6, a non-modulated signal (a signal obtained by FM-modulating a soundless signal) corresponding to a predetermined electric field strength is inputted to the RF 1 as a test signal (S131), and an audio signal outputted by the FM demodulation unit 4 is inputted to the level calculation unit 8 to calculate a noise level (S132). In this case, since the inputted test signal is a non-modulated signal, the audio signal outputted by the FM demodulation unit 4 is a soundless signal. Thus, the signal level of the audio signal is none other than the noise level. The level calculation unit 8 outputs the calculated noise level to the monitor 10 externally connected to the FM receiving apparatus. An operator externally monitoring the adjustment of the FM receiving apparatus re-inputs the noise level displayed on the monitor 10 to the correction value calculation unit 9. The correction value calculation unit 9 calculates a difference between the actually calculated noise level and a reference noise level that should be calculated (S133), and uses the calculated difference value as a correction value of the electric field strength associated with the noise spectrum pattern (S134).

Moreover, while the operator re-inputs the noise level displayed on the monitor 10 into the correction value calculation unit 9 in the configuration shown in FIG. 6, the stage in which a noise level is monitored and re-inputted may be automated using an adjustment tool or a computer program. In a configuration such as that shown in FIG. 6 in which a noise level is externally monitored and re-inputted either manually or automatically, the respective processing units such as the correction value calculation unit 9 are not required to judge, as an internal process, whether the apparatus is in actual operation or in the adjustment stage.

Figure 11:
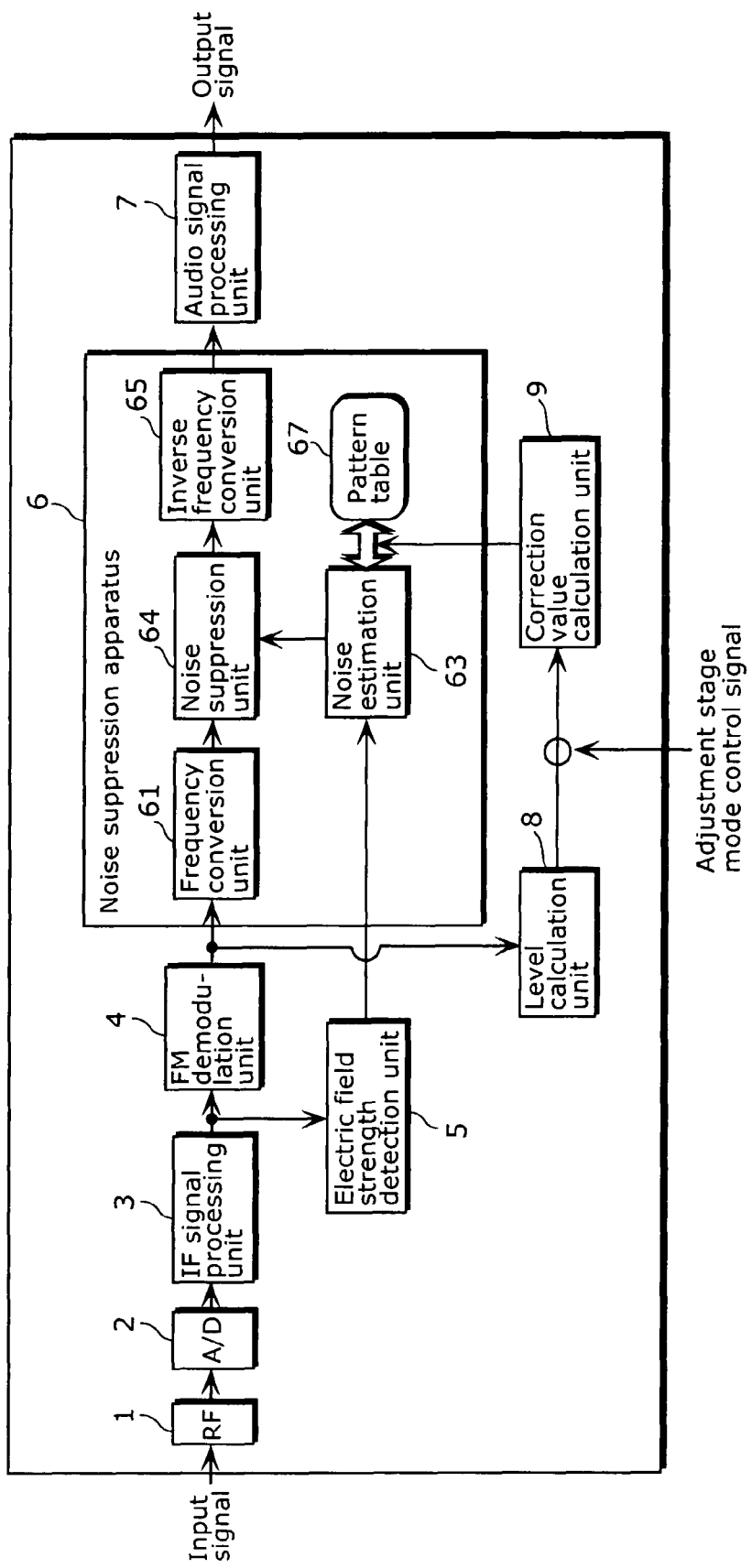
FIG. 11 is a block diagram showing an example of a configuration in a case where a control signal indicating that the current mode is an adjustment step mode is externally inputted between a level calculation unit and a correction value calculation unit.

FIG. 11 is a block diagram showing an example of a configuration in a case where a control signal indicating that the current mode is the adjustment stage mode is externally inputted between the level calculation unit 8 and the correction value calculation unit 9. As shown in FIG. 11, by having the correction value calculation unit 9 recognize that the current mode is the adjustment stage mode, while it is necessary to judge whether the apparatus is in actual operation or in the adjustment stage when calculating a correction value from the calculated noise level, the stage in which the noise level is manually re-inputted by the operator or the like may now be omitted. The input position of the control signal is not limited to between the level calculation unit 8 and the correction value calculation unit 9, and may instead be inputted between the FM demodulation unit 4 and the level calculation unit 8. In addition, input position of the control signal may be set to the output position of the correction value calculation unit 9 as long as the calculated correction value is reflected on the noise estimation unit 63 or the pattern table 67.

Figure 12:
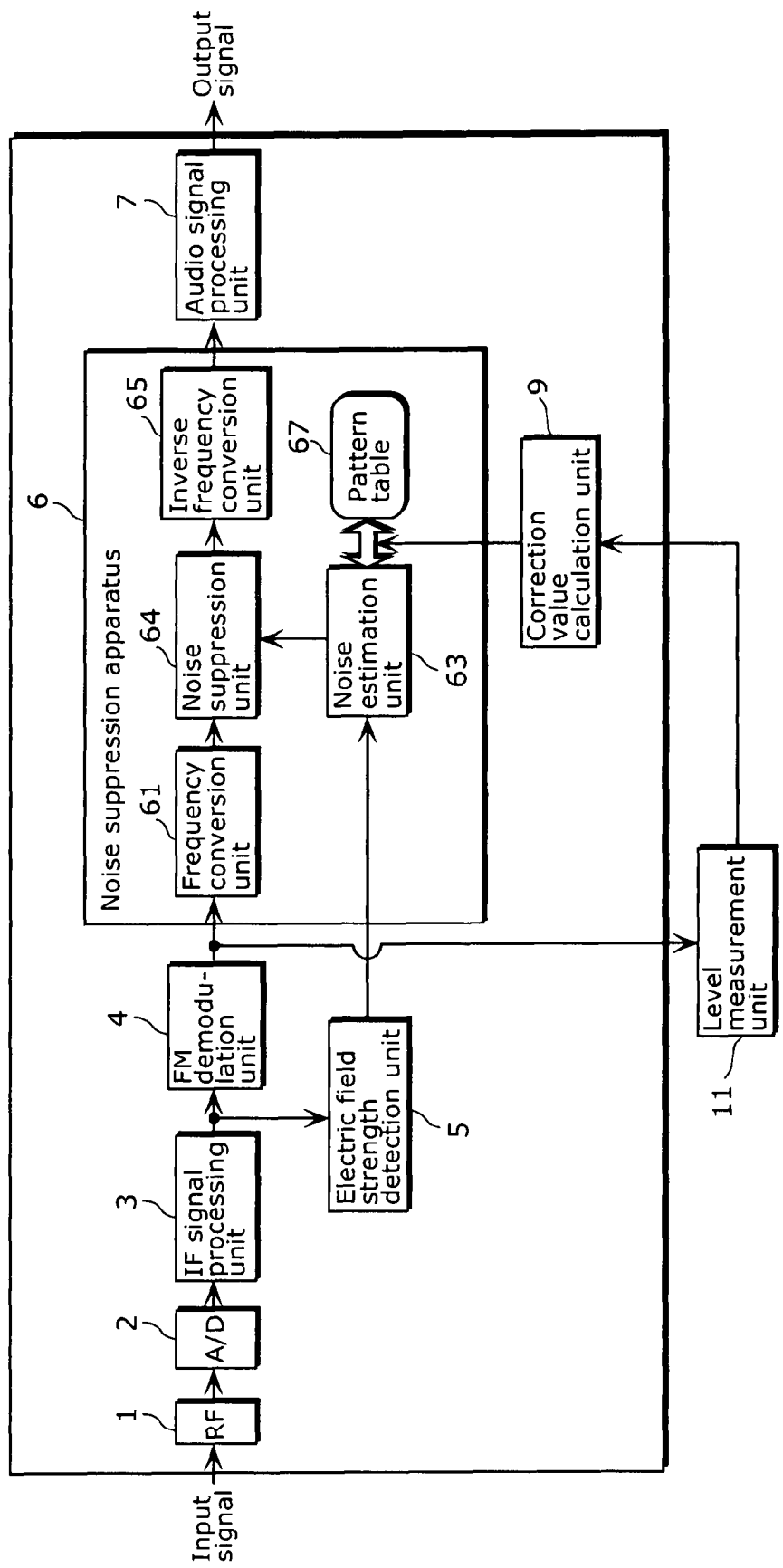
FIG. 12 is a block diagram showing a configuration example of an FM receiving apparatus in a case where a level measurement unit is externally provided.

FIG. 12 is a block diagram showing a configuration example of an FM receiving apparatus in a case where a level measurement unit 11 is externally provided. As shown in FIG. 12, the apparatus may be configured without providing the level calculation unit 8 by outputting the FM demodulated audio signal without modification, manually performing level measurement at the externally-provided level measurement unit 11 that is a measurement device or the like and re-inputting the measured level to the correction value calculation unit 9. Such a configuration enables reduction of extraneous components such as the level calculation unit 8 which become unnecessary after shipment.

Figure 13:
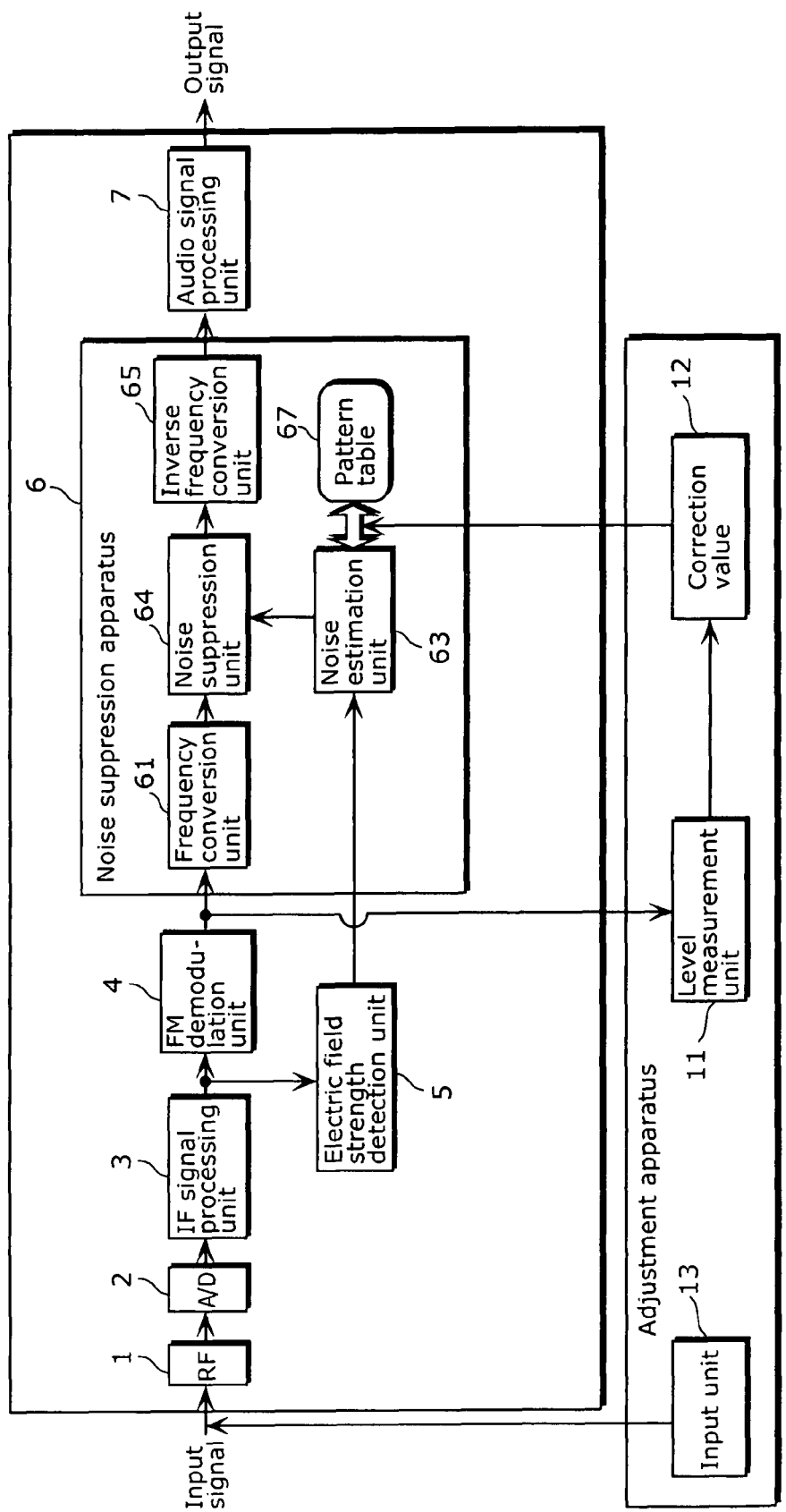
FIG. 13 is a diagram showing a system configuration in a case where an adjustment apparatus that performs adjustment on an FM receiving apparatus before shipment is externally connected to an FM receiving apparatus.

FIG. 13 is a diagram showing a system configuration in a case where an adjustment apparatus that performs adjustment on an FM receiving apparatus before shipment is externally connected to an FM receiving apparatus. FIG. 13 shows a configuration example of a system in which: the correction value calculation unit 9 is further reduced from the components of the FM receiving apparatus; components related to adjustment prior to shipment are separately configured as an adjustment apparatus; and adjustment is performed by externally connecting the adjustment apparatus to the FM receiving apparatus. In FIG. 13, the adjustment apparatus includes the level measurement unit 11, a correction value conversion unit 12 and a test signal input unit 13. The test signal input unit 13 is an example of a test signal input unit that inputs a test signal corresponding to a predetermined electric field strength to the FM receiving apparatus. The test signal input unit 13 inputs a test signal corresponding to a predetermined electric field strength to the RF 1, monitors an audio signal outputted by the FM demodulation unit 4, and inputs the audio signal to the level measurement unit 11 to measure a signal level. In this case, since the inputted test signal is a non-modulated signal, the audio signal outputted by the FM demodulation unit 4 is a soundless signal. Thus, the signal level of the audio signal is none other than the noise level. The level measurement unit 11 is an example of a level calculation unit that uses the test signal as an input to calculate a noise level contained in the audio signal obtained from the FM demodulation unit. The correction value conversion unit 12 is an example of a correction unit that corrects the association of a noise spectrum pattern stored in the pattern data storage unit with an electric field strength using a noise level calculated by the level calculation unit, and calculates a correction value in the same manner as the correction value calculation unit 9. In the case of the present configuration, since the adjustment stage may be easily automated using an adjustment apparatus, a computer that executes a processing program of the adjustment apparatus, or the like, adjustment may be performed using test signals corresponding to a plurality of electric field strengths. In this case, the level measurement unit 11 is an example of a level calculation unit that calculates the noise level of a signal obtained using as inputs two test signals corresponding to different electric field strengths. In addition, the correction value conversion unit 12 is an example of a correction unit that: calculates the respective differences between the noise levels actually calculated by the level calculation unit and the noise levels that should be calculated with respect to the test signals; calculates a proportionality coefficient of each difference value with respect to the electric field strength to which each test signal corresponds; and uses the proportionality coefficients to correct the electric field strength associated with the noise spectrum pattern. Accordingly, for the FM receiving apparatus to be adjusted, even in a case where the variation $\Delta X$ of the input electric field strength and the variation $\Delta Y$ of the output noise level is not in a relationship of $\Delta X = \Delta Y$ (when the slope is not 1), the slope between the two points may be calculated to calculate an appropriate correction value in a band in which the input electric field strength and the output noise level are in a proportional relationship. Such a configuration enables adjustment to be performed with preferable follow-up performance even when the slope of the input/output characteristics assumed when creating pattern data does not match the slope of the input/output characteristics of the FM receiving apparatus to be adjusted.

Second Embodiment

Figure 14:
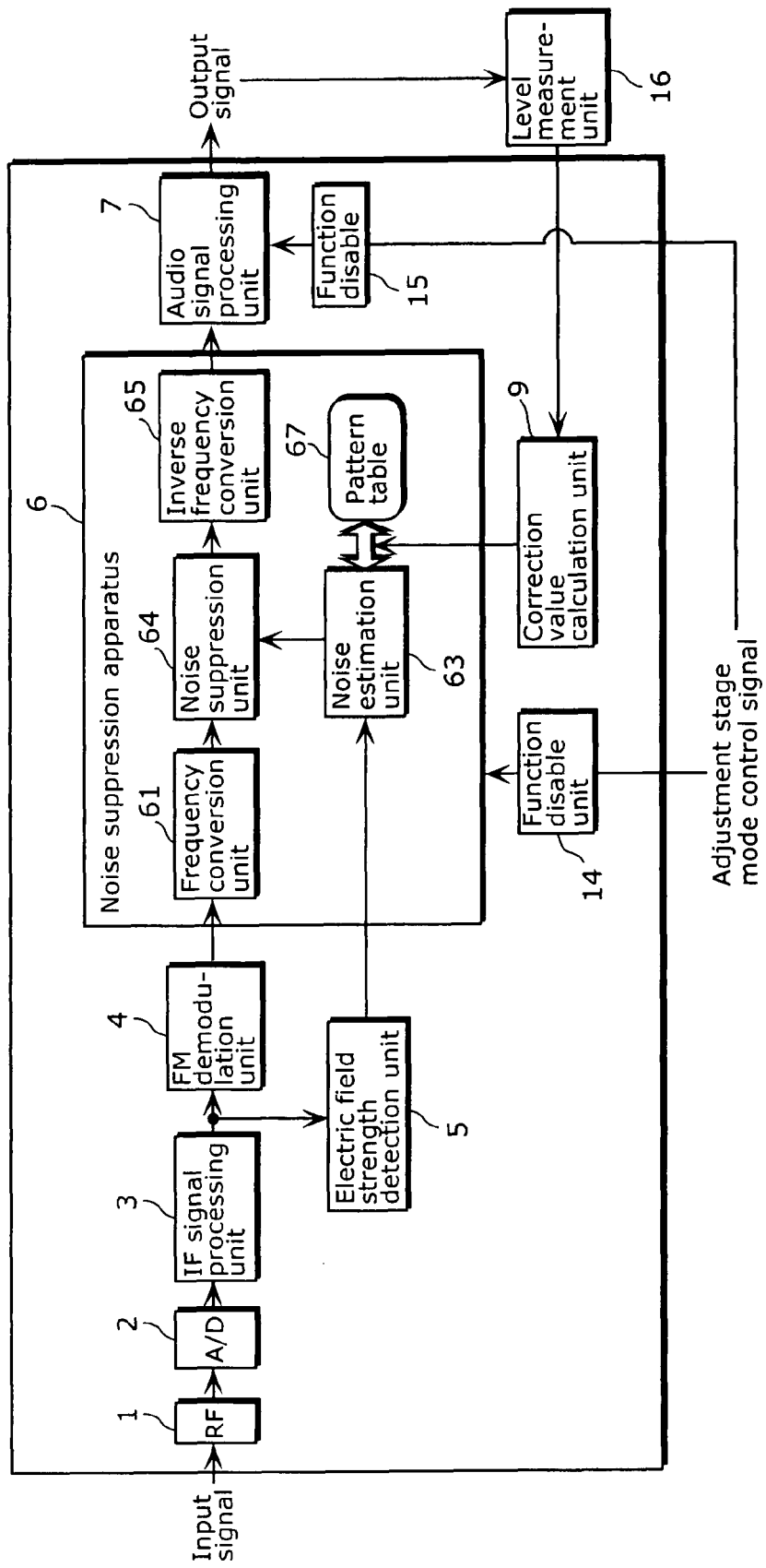
FIG. 14 is a block diagram showing a configuration of an FM receiving apparatus according to a second embodiment of the present invention.

FIG. 14 is a block diagram showing a configuration of an FM receiving apparatus according to a second embodiment of the present invention. The major difference between the FM receiving apparatus according to the second embodiment and the FM receiving apparatus according to the first embodiment is that the FM receiving apparatus according to the second embodiment includes a configuration in which the functions of the noise suppression apparatus 6 and the audio signal processing unit 7 is turned off according to a control signal indicating that the current mode is the adjustment stage mode. By turning off the functions of the noise suppression apparatus 6 and the audio signal processing unit 7, the output signal of the FM receiving apparatus when a test signal is inputted may be used without modification for noise level measurement, thereby eliminating the need to provide a configuration that extracts intermediate signals such as the audio signal outputted by the FM demodulation unit 4 to the outside of the FM receiving apparatus.

More specifically, the FM receiving apparatus according to the second embodiment includes a function disable unit 14, a function disable unit 15 and a level measurement unit 16 in addition to the configuration of the FM receiving apparatus shown in FIG. 12. The function disable unit 14 is a switch that disables the function of the noise suppression apparatus 6 in response to an externally-inputted adjustment stage mode control signal. The function disable unit 15 is a switch that disables the function of the audio signal processing unit 7 in response to an externally-inputted adjustment stage mode control signal. The function disable unit 14 is an example of a noise suppression function suspension unit that suspends the function of the noise suppression unit. The level measurement unit 16 is an example of realizing a level calculation step for calculating a noise level contained in the audio signal obtained in a state where the function of the noise suppression unit is suspended by the FM receiving apparatus.

When disabling the function of the noise suppression apparatus 6 and the audio signal processing unit 7 using adjustment stage mode control, the output signal may be considered equivalent to an audio signal after FM demodulation. Therefore, similar adjustment effect may be obtained by measuring the signal level of the output signal from the FM receiving apparatus and re-inputting the measured signal level to the correction value calculation unit 9. Obviously, even with the present embodiment, the correction value calculation unit 9 may be replaced with the correction value conversion unit 12 provided to the outside of the FM receiving apparatus as shown in FIG. 13. In other words, a configuration is possible in which processing up to correction value conversion is performed as an external adjustment stage and a correction value is re-inputted to the noise estimation unit 63 or the pattern table 67. However, the same functions shown in FIG. 13 are required for the correction value conversion unit 12.

Third Embodiment

Figure 15:
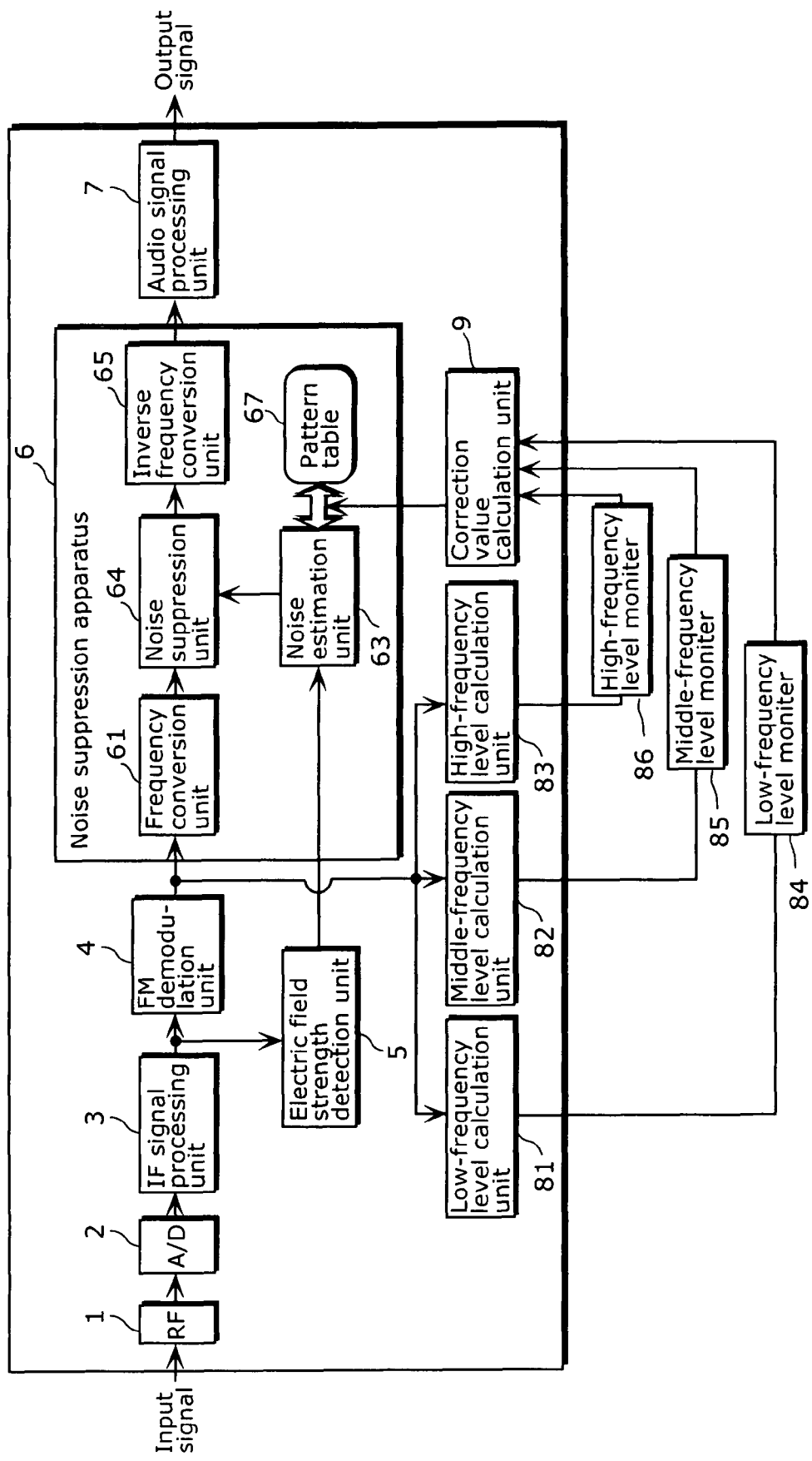
FIG. 15 is a block diagram showing a configuration of an FM receiving apparatus according to a third embodiment of the present invention.

FIG. 15 is a block diagram showing a configuration of an FM receiving apparatus according to a third embodiment of the present invention. The major difference between the FM receiving apparatus according to the third embodiment and the FM receiving apparatus according to the first embodiment is that the FM receiving apparatus according to the third embodiment includes a configuration in which: signals outputted by the FM demodulation unit 4 is separated into low, middle and high frequency bands; a correction value is calculated from a noise level calculated in each frequency band; and noise suppression is performed using a noise spectrum pattern corrected for each frequency band according to the calculated correction value. The FM receiving apparatus according to the third embodiment includes a low-frequency level calculation unit 81, a middle-frequency level calculation unit 82, and a high-frequency level calculation unit 83 in place of the level calculation unit 8 shown in FIG. 6. The low-frequency level calculation unit 81 calculates the noise level of the low-frequency component of the signal obtained when the test signal is inputted. The middle-frequency level calculation unit 82 calculates the noise level of the middle-frequency component of the signal obtained when the test signal is inputted. The high-frequency level calculation unit 83 calculates the noise level of the high-frequency component of the signal obtained when the test signal is inputted. The low-frequency level calculation unit 81, the middle-frequency level calculation unit 82, and the high-frequency level calculation unit 83 are examples of a level calculation unit that calculates the noise level for each of a plurality of frequency bands that are separated from a signal obtained when the test signal is inputted. In addition, the FM receiving apparatus according to the third embodiment includes a low-frequency monitor 84, a middle-frequency monitor 85, and a high-frequency monitor 86 for outputting the respective noise levels calculated by the low-frequency level calculation unit 81, the middle-frequency level calculation unit 82, and the high-frequency level calculation unit 83. The operator inputs the respective noise levels displayed on the low-frequency monitor 84, the middle-frequency monitor 85, and the high-frequency monitor 86 to the correction value calculation unit 9. The correction value calculation unit 9 is an example of a correction unit that respectively compares the noise levels actually calculated by the level calculation units for each frequency band with the noise levels that should be calculated with respect to the test signal for each frequency band and uses the respective comparison results to correct, for each frequency band, the electric field strength associated with the noise spectrum pattern. Correction values of the electric field strength associated with the noise spectrum pattern in correspondence to noise levels calculated for low, middle, and high frequencies are calculated and retained. When reading out a noise spectrum pattern from the pattern table 67, the noise estimation unit 63 reads out pattern data for each band in accordance with the correction values retained in the correction value calculation unit 9 to estimate noise components.

As seen, when adjusting noise spectrum patterns, by using a noise level at each of processing bands separated into low, middle, and high frequencies as an adjustment value instead of performing single-point adjustment using a noise level, it is now possible to perform adjustment with greater accuracy. Moreover, while separation is performed into the three bands of low, middle, and high frequencies in FIG. 15, the number of separations is not limited to three. Furthermore, the separated bandwidths need not be uniform, and may be varied according to the spectral shape. In particular, since a noise spectrum occurring in an FM broadcast is white-colored in a strong electric field but low-frequency components of the spectrum increases as the electric field weakens, adjustment may be performed more efficiently by setting a greater number of adjustment points in low-frequency where variation due to electric field strength is greater. In this case, the low-frequency level calculation unit 81, the middle-frequency level calculation unit 82, and the high-frequency level calculation unit 83 are examples of a level calculation unit that calculates the noise level for each of a plurality of frequency bands that is separated from a signal obtained when the test signal is inputted such that the low-frequency is more finely divided, while the correction value calculation unit 9 is an example of a correction unit that corrects the electric field strength associated with the noise spectrum pattern for each of the frequency bands that are more finely divided at low frequency. In addition, efficient adjustment may also be performed by performing separation based on a human psychoacoustic model. For example, by performing adjustment at around 1 kHz to 2 kHz where human beings are most acoustically sensitive, acoustically accurate noise suppression capabilities may be obtained. In this case, the low-frequency level calculation unit 81, the middle-frequency level calculation unit 82, and the high-frequency level calculation unit 83 are examples of a level calculation unit that calculates the noise level for each of a plurality of frequency bands that is separated from a signal obtained when the test signal is inputted such that the audible range is more finely divided according to human acoustic characteristics, while the correction value calculation unit 9 is an example of a correction unit that corrects the electric field strength associated with the noise spectrum pattern for each of the frequency bands that are more finely divided at the audible level.

Fourth Embodiment

Figure 16:
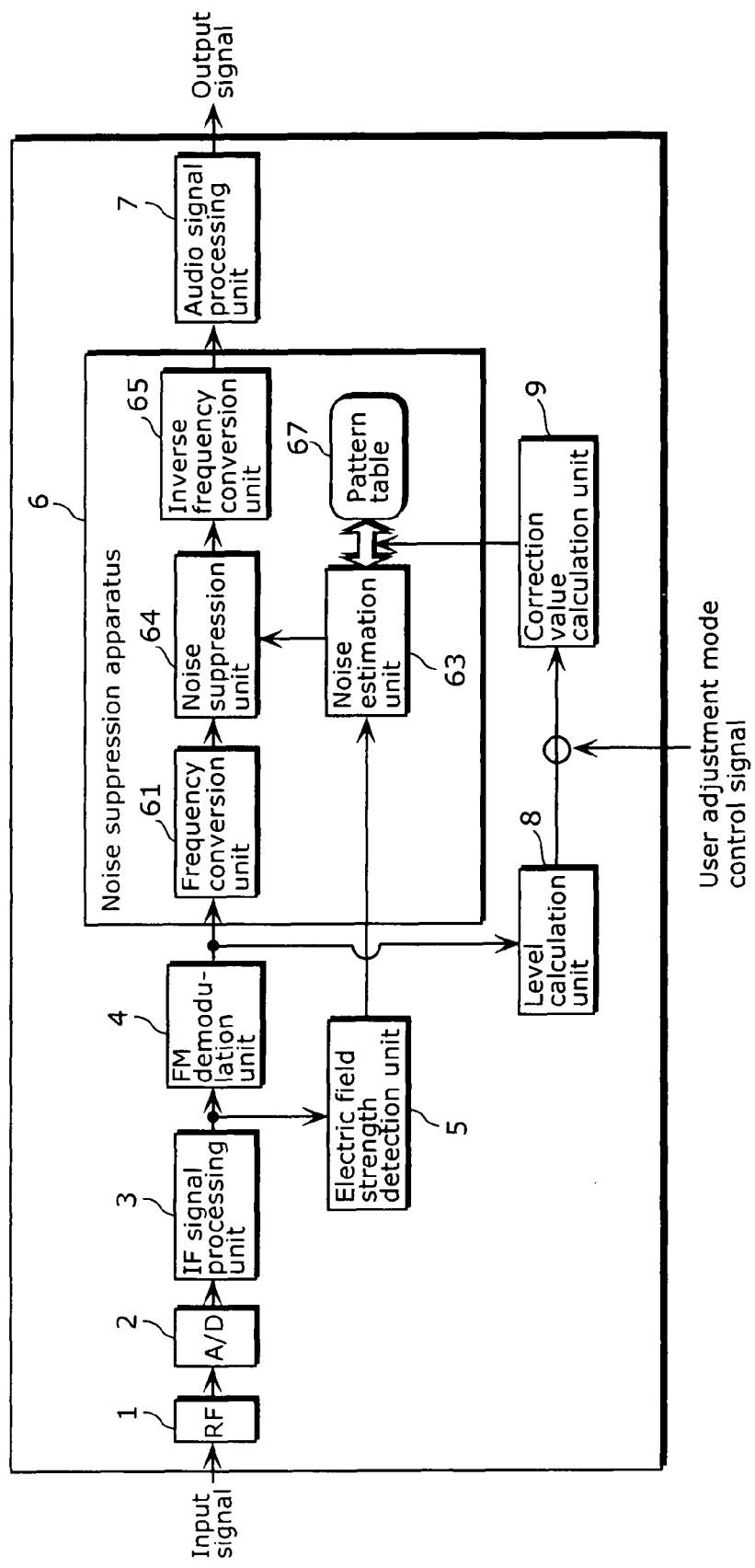
FIG. 16 is a block diagram showing a configuration of an FM receiving apparatus according to a fourth embodiment of the present invention.

FIG. 16 is a block diagram showing a configuration of an FM receiving apparatus according to a fourth embodiment of the present invention. The major difference between the FM receiving apparatus according to the fourth embodiment and the FM receiving apparatus according to the first to third embodiments is as described below. In other words, for the first to third embodiments, the electric field strength associated with a noise spectrum pattern is corrected using a test signal upon adjustment prior to shipment. In contrast, the fourth embodiment is arranged so that a user can correct the electric field strength associated with a noise spectrum pattern using a broadcast signal received by the FM receiving apparatus. As shown in FIG. 16, the FM receiving apparatus according to the fourth embodiment is similar in configuration to the FM receiving apparatus according to the first embodiment shown in FIG. 11, and a control signal indicating that the current mode is a user adjustment mode is externally inputted between the level calculation unit 8 and the correction value calculation unit 9. This input is performed when the user presses, for instance, a noise suppression adjustment button or the like provided on a user interface unit of an FM radio receiver. Furthermore, another difference from the configuration shown in FIG. 11 is that an electric field strength detected by the electric field strength detection unit 5 is inputted to the level calculation unit 8.

As for noise spectrum pattern adjustment, since noise characteristics change after shipment such as when the user adds a commercially available antenna amplifier, cases occur where re-adjustment is desired. In the case of adjustment by the user, due to the difficulty of inputting a test signal, adjustment is performed using an actual received signal. The noise spectrum pattern is adjusted by inputting a noise level calculated by the level calculation unit 8 to the correction value calculation unit 9 only when an electric field strength signal detected by the electric field strength detection unit 5 is used and the detected electric field strength is a predetermined electric field strength (for example, in the first to third embodiments, an electric field strength that is the same as the test signal upon adjustment at the factory). In this case, the electric field strength detection unit 5 is an example of an electric field strength detection unit that measures the electric field strength of the received broadcast signal and outputs data indicating the electric field strength, while the level calculation unit 8 is an example of a level calculation unit that calculates the noise level contained in the audio signal obtained by the FM receiving unit when the electric field strength of the received broadcast signal is a predetermined electric field strength. When calculating a noise level using an actual broadcast signal, since there are no signals with an amplitude greater than, for instance, a non-modulated signal, it is possible to perform estimation through bottom hold processing and the like of a signal level calculated by the level calculation unit 8 for each sample. Furthermore, a soundless portion of an audio signal may be detected at a timing such as a time tone, whereby the signal level at that moment may be used as a noise level.

Moreover, each function block shown in the block diagrams (FIGS. 6, 7, 10 to 15 and the like) are typically realized as an LSI that is an integrated circuit. These LSIs may be individually made into single chips, or made into single chips that contain a portion of or all of the function blocks. For instance, function blocks other than the memory may be made into a single chip.

While the term LSI has been used above, terms such as IC, system LSI, super LSI, and ultra LSI may be used according to differences in integration degree.

In addition, the method of circuit integration is not limited to LSIs, and may instead be realized by a dedicated circuit or a general-purpose processor. An FPGA (Field Programmable Gate Array) that is programmable after the manufacturing of an LSI or a reconfigurable processor in which connections and settings of circuit cells inside the LSI is reconfigurable may also be used.

Furthermore, depending on the emergence of circuit integration technology that replaces LSI due to progress in semiconductor technology or other derivative technology, it is obvious that such technology may be used to integrate the function blocks. Possibilities in this regard include the application of biotechnology and the like.

Moreover, among the respective function blocks, only the units that store data to be subjected to encoding or decoding may be separately configured without making into a single chip.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The noise suppression apparatus according to the present invention resolves variations in capabilities due to individual differences among the RFs by simple adjustments through noise level measurement, and is useful as an FM receiving apparatus that combines an adjustment apparatus which does not require increases in cost due to improved RF capabilities or increased processing volume/memory volume, a receiving apparatus in a road traffic information system, and the like.

The invention claimed is:

1. A noise suppression apparatus which suppresses a noise component contained in an audio signal obtained by receiving a broadcast signal transferred via a transfer path including ground waves and satellite waves, said noise suppression apparatus comprising:
    a pattern data storage unit operable to store, in advance, plural spectrum patterns of the noise component that are determined for each electric field strength;
    a noise estimation unit operable to acquire data indicating the electric field strength of the received broadcast signal, read out a noise spectrum pattern corresponding to the electric field strength indicated by the acquired data from said pattern data storage unit, and estimate a noise component contained in the audio signal;
    a noise suppression unit operable to suppress the estimated noise component from the audio signal;
    a level calculation unit operable to calculate a noise level contained in an audio signal obtained by inputting a test signal instead of the broadcast signal, the test signal corresponding to a predetermined electric field strength; and
    a correction unit operable to correct an association between the noise spectrum pattern stored in said pattern data storage unit and the electric field strength using the noise level calculated by said level calculation unit,
    wherein said noise estimation unit is operable to read out the noise spectrum pattern according to the association corrected by said correction unit.

2. The noise suppression apparatus according to claim 1, wherein said level calculation unit is operable to calculate a noise level contained in a signal obtained by inputting the test signal generated through a simulation of a broadcast signal that transfers a soundless signal and which is received at a predetermined electric field strength, and said correction unit is operable to compare the noise level actually calculated by said level calculation unit and a noise level that should be calculated with respect to the test signal, and use a result of the comparison to correct the electric field strength associated to the noise spectrum pattern.

3. The noise suppression apparatus according to claim 2, wherein said correction unit is operable to calculate a difference between the noise level actually calculated by said level calculation unit and the noise level that should be calculated with respect to the test signal, and use the calculated difference value itself as a correction amount to correct the electric field strength associated with the noise spectrum pattern.

4. The noise suppression apparatus according to claim 2, wherein said level calculation unit is operable to calculate a noise level of a signal obtained respectively by inputting two test signals corresponding to different electric field strengths, and said correction unit is operable to calculate the respective differences between each of the noise levels actually calculated by said level calculation unit and each of the noise levels that should be calculated with respect to the test signals, calculate a proportionality coefficient of each difference value with respect to the electric field strength to which each test signal corresponds, and use the proportionality coefficients to correct the electric field strength associated with the noise spectrum pattern.

5. The noise suppression apparatus according to claim 2, wherein said level calculation unit is operable to separate a signal obtained by inputting the test signal into a plurality of frequency bands, and calculate the noise level for each of the separated frequency bands, and said correction unit is operable to compare the noise levels actually calculated by said level calculation unit for each of the frequency bands with the noise levels that should be calculated with respect to the test signal for each of the frequency bands, respectively, and use the respective comparison results to correct the electric field strength associated with the noise spectrum pattern for each of the frequency bands.

6. The noise suppression apparatus according to claim 1, wherein said level calculation unit is operable to separate a signal obtained by inputting the test signal into a plurality of frequency bands, and calculate the noise level for each of the separated frequency bands, and said correction unit is operable to compare the noise levels actually calculated by said level calculation unit for each of the frequency bands with the noise levels that should be calculated with respect to the test signal for each of the frequency bands, respectively, and use the respective comparison results to correct the electric field strength associated with the noise spectrum pattern for each of the frequency bands.

7. The noise suppression apparatus according to claim 6, wherein said level calculation unit is operable to separate the signal obtained by inputting the test signal into a plurality of frequency bands that are more finely divided in low frequency, and calculate a noise level for each of the separated frequency bands, and said correction unit is operable to correct the electric field strength associated with the noise spectrum pattern for each of the frequency bands that are more finely divided in the low frequency.

8. The noise suppression apparatus according to claim 6, wherein said level calculation unit is operable to separate a signal obtained by inputting the test signal into a plurality of frequency bands that are more finely divided in the audible range of the signal according to human acoustic characteristics, and calculate a noise level for each of the separated frequency bands, and said correction unit is operable to correct the electric field strength associated with the noise spectrum pattern for each of the frequency bands that are more finely divided in the audible range.

9. An FM receiving apparatus which receives an FM-modulated broadcast signal and outputs an audio signal of which noise component is suppressed, said FM receiving apparatus comprising:
an FM demodulation unit operable to receive an FM-modulated broadcast signal and perform FM demodulation;
a pattern data storage unit operable to store, in advance, plural spectrum pattern of the noise component contained in the audio signal obtained by said FM demodulation unit and which are determined for each electric field strength;
a noise estimation unit operable to acquire data indicating an electric field strength of the received broadcast signal, read out a noise spectrum pattern corresponding to the electric field strength indicated by the acquired data from said pattern data storage unit, and estimate a noise component contained in the audio signal;
a noise suppression unit operable to suppress the estimated noise component contained in the audio signal;
a level calculation unit operable to calculate a noise level contained in an audio signal obtained by inputting a test signal instead of the broadcast signal, the test signal corresponding to a predetermined electric field strength; and
a correction unit operable to correct an association between the noise spectrum pattern stored in said pattern data storage unit and the electric field strength using the noise level calculated by said level calculation unit,
wherein said noise estimation unit reads out the noise spectrum pattern according to the association corrected by said correction unit.

10. The FM receiving apparatus according to claim 9, further comprising:
an electric field strength detection unit operable to measure the electric field strength of the received broadcast signal and output data indicating the electric field strength,
wherein said noise estimation unit is operable to acquire data indicating the electric field strength of the received broadcast signal from said electric field strength detection unit,
said level calculation unit is operable to calculate a noise level contained in the audio signal obtained by said FM demodulation unit when the electric field strength of the received broadcast signal is a predetermined electric field strength, and
said correction unit is operable to correct the association between the noise spectrum pattern stored in said pattern data storage unit and the electric field strength, by using the noise level calculated by said level calculation unit.

11. An adjustment method for a noise suppression apparatus which suppresses a noise component contained in an audio signal obtained by receiving a broadcast signal transferred via a transfer path including ground waves and satellite waves,
wherein the noise suppression apparatus includes:
a pattern data storage unit operable to store, in advance, plural spectrum patterns of the noise component that are determined for each electric field strength;
a noise estimation unit operable to acquire data indicating the electric field strength of the received broadcast signal, read out a noise spectrum pattern corresponding to the electric field strength indicated by the acquired data from the pattern data storage unit, and estimate a noise component contained in the audio signal; and a noise suppression unit operable to suppress the estimated noise component contained in the audio signal, wherein said adjustment method comprises:

calculating a noise level contained in an audio signal obtained by inputting a test signal instead of the broadcast signal, the test signal corresponding to a predetermined electric field strength; and correcting an association between the noise spectrum pattern stored in said pattern data storage unit and the electric field strength using the noise level calculated in said calculating, and wherein the noise estimation unit is made to read out the noise spectrum pattern according to the association corrected in said correcting.

12. An adjustment method for an FM receiving apparatus which receives an FM-modulated broadcast signal and outputs an audio signal of which noise component is suppressed, wherein the FM receiving apparatus includes:

an FM demodulation unit operable to receive an FM-modulated broadcast signal and perform FM demodulation;

a pattern data storage unit operable to store, in advance, plural spectrum patterns of the noise component contained in the audio signal obtained by the FM demodulation unit and which are determined for each electric field strength;

a noise estimation unit operable to acquire data indicating an electric field strength of the received broadcast signal, read out a noise spectrum pattern corresponding to the electric field strength indicated by the acquired data from the pattern data storage unit, and estimate a noise component contained in the audio signal; and a noise suppression unit operable to suppress the estimated noise component contained in the audio signal, and wherein said adjustment method comprises:

inputting a test signal instead of the broadcast signal to said FM receiving apparatus, the test signal corresponding to a predetermined electric field strength;

calculating, using the test signal as input, a noise level contained in an audio signal obtained by the FM demodulation unit; and correcting an association between the noise spectrum pattern stored in the pattern data storage unit and the electric field strength using the noise level calculated in said calculating, and wherein the noise estimation unit is made to read out the noise spectrum pattern according to the association corrected in said correcting.

13. The adjustment method for an FM receiving apparatus according to claim 12, wherein said FM receiving apparatus further includes a noise suppression function suspension unit operable to suspend functioning of the noise suppression unit, and said calculating includes calculating, using the test signal as input, a noise level contained in an audio signal obtained in a state where the functioning of said noise suppression unit is suspended by the FM receiving apparatus.

14. An adjustment apparatus for an FM receiving apparatus which receives an FM-modulated broadcast signal and outputs an audio signal of which noise component is suppressed, wherein the FM receiving apparatus includes:

an FM demodulation unit operable to receive an FM-modulated broadcast signal and perform FM demodulation;

a pattern data storage unit operable to store, in advance, plural spectrum patterns of the noise component contained in the audio signal obtained by the FM demodulation unit and which are determined for each electric field strength;

a noise estimation unit operable to acquire data indicating an electric field strength of the received broadcast signal, read out a noise spectrum pattern corresponding to the electric field strength indicated by the acquired data from the pattern data storage unit, and estimate a noise component contained in the audio signal; and a noise suppression unit operable to suppress the estimated noise component contained in the audio signal, wherein said adjustment apparatus comprises:

a test signal input unit operable to input a test signal instead of the broadcast signal to said FM receiving apparatus, the test signal corresponding to a predetermined electric field strength;

a level calculation unit operable to calculate, using the test signal as input, a noise level contained in an audio signal obtained by the FM demodulation unit; and a correction unit operable to correct an association between the noise spectrum pattern stored in said pattern data storage unit and the electric field strength using the noise level calculated by said level calculation unit, and wherein the noise estimation unit is operable to read out the noise spectrum pattern according to the association corrected by said correction unit.

15. An FM receiving integrated circuit for receiving an FM-modulated broadcast signal and outputting an audio signal of which noise component is suppressed, said FM receiving integrated circuit comprising:

an FM demodulation unit operable to receive an FM-modulated broadcast signal and perform FM demodulation;

a pattern data storage unit operable to store, in advance, plural spectrum patterns of the noise component contained in the audio signal obtained by said FM demodulation unit and which are determined for each electric field strength;

a noise estimation unit operable to acquire data indicating an electric field strength of the received broadcast signal, read out a noise spectrum pattern corresponding to the electric field strength indicated by the acquired data from said pattern data storage unit, and estimate a noise component contained in the audio signal;

a noise suppression unit operable to suppress the estimated noise component contained in the audio signal;

a level calculation unit operable to calculate a noise level contained in an audio signal obtained by inputting a test signal instead of the broadcast signal, the test signal corresponding to a predetermined electric field strength; and a correction unit operable to correct an association between the noise spectrum pattern stored in said pattern data storage unit and the electric field strength using the noise level calculated by said level calculation unit, wherein said noise estimation unit is operable to read out the noise spectrum pattern according to the association corrected by said correction unit.

16. A program stored on a non-transitory computer-readable recording medium, said program being for an adjustment apparatus for an FM receiving apparatus which receives an FM-modulated broadcast signal and outputs an audio signal of which noise component is suppressed, wherein the FM receiving apparatus includes:

an FM demodulation unit operable to receive an FM-modulated broadcast signal and perform FM demodulation;

a pattern data storage unit operable to store, in advance, plural spectrum patterns of the noise component contained in the audio signal obtained by said FM demodulation unit and which are determined for each electric field strength;

a noise estimation unit operable to acquire data indicating an electric field strength of the received broadcast signal, read out a noise spectrum pattern corresponding to the electric field strength indicated by the acquired data from said pattern data storage unit, and estimate a noise component contained in the audio signal; and a noise suppression unit operable to suppress the estimated noise component from the audio signal;

wherein said program causes a computer to execute an adjustment method comprising:

inputting a test signal instead of the broadcast signal to said FM receiving apparatus, the test signal corresponding to a predetermined electric field strength;

calculating, using the test signal as input, a noise level contained in an audio signal obtained by the FM demodulation unit; and correcting an association between the noise spectrum pattern stored in the pattern data storage unit and the electric field strength using the noise level calculated in said calculating, and wherein the noise estimation unit is made to read out the noise spectrum pattern according to the association corrected in said correcting.

* * * * *